United States Patent
Tomidokoro

(10) Patent No.: US 6,833,928 B2
(45) Date of Patent: Dec. 21, 2004

(54) IMAGE FORMING APPARATUS SUPERVISING SYSTEM

(75) Inventor: Nobuaki Tomidokoro, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/378,626

(22) Filed: Mar. 5, 2003

(65) Prior Publication Data

US 2003/0137694 A1 Jul. 24, 2003

Related U.S. Application Data

(63) Continuation of application No. 09/296,497, filed on Apr. 22, 1999.

(30) Foreign Application Priority Data

Apr. 22, 1998 (JP) .............................................. 10-111846
May 8, 1998 (JP) .......................................... 10-125763

(51) Int. Cl.$^7$ .............................................. G06F 15/00
(52) U.S. Cl. .......................... 358/1.15; 358/1.14; 399/8
(58) Field of Search ........................ 358/1.1, 1.5, 1.12, 358/1.13, 1.14, 1.15; 399/8, 9, 10

(56) References Cited

U.S. PATENT DOCUMENTS 5,600,403 A * 2/1997 Inoo ................................ 399/8

* cited by examiner

Primary Examiner—Mark Wallerson
(74) Attorney, Agent, or Firm—Oblon, Spivak, McClelland, Maier & Neustadt, P.C.

(57) ABSTRACT

An image forming apparatus supervising system includes a central control apparatus, a plurality of image forming apparatuses each having a memory and connected to the central control apparatus with a communication line, and a data communication apparatus connected to the plurality of image forming apparatuses and the central control apparatus using a communication line. An information code data transmitting device transmits information code data, having a plurality of levels in which character data is respectively included from the central control apparatus to the image forming apparatus, and a data reading device reads data corresponding to the information code data from the memory. A response data transmitting device transmits the data read from the memory to the central control apparatus via the data communication apparatus and the communication line. The central control apparatus changes all character data included in one or more levels lower than a prescribed level of the information code data with particular character data before transmitting the information code data when reading all data in the memory, which accords with character data included in one or more levels higher than the prescribed level of the information code data. Further, the data reading device reads only data of the memory which accords with the character data not changed with the particular character data when receiving the information code data.

9 Claims, 26 Drawing Sheets

| CODE | PROCESS NAME | CONTENTS |
|---|---|---|
| 30 | SC CALL | AUTO CALL WHEN A SC PROBLEM OCCURS |
| 31 | MANUAL CALL | AUTO CALL WHEN A MANUAL SWITCH IS DEPRESSED |
| 32 | ALARM SENDING | AUTO ALARM CALL |
| 33 | SUPPLY REQUEST CALL | AUTO CALL WHEN A SUPPLY REQUEST SW IS DEPRESSED |
| 22 | BLOCK BILLING | AUTO CALL WHEN BLOCK BILLING NUMBER IS COUNTED UP |
| 02 | DATA READING | READING DATA STORED IN A PPC |
| 04 | DATA WRITING | CHANGE DATA STORED IN A PPC |
| 03 | EXECUTION | EXECUTE TEST UNDER REMOTE CONTROL MANNER |
| 08 | DEVICE CODE CHECK | CHECK DATA COMMUNICATION FUNCTION |

CONTENTS OF PROCESS CODE

*FIG. 8*

| CODE | DATA LENGTH | CONTENTS |
|---|---|---|
| INFORMATION CODE | 11 | REPRESENTS A KIND OF SPECIFIC INFORMATION |
| DIGIT NUMBER OF DATA PORTION | 2 | REPRESENTS DATA LENGTH OF A FOLLOWING DATA PORTION BY AN ASCII CODE (00:NO DATA PORTION) |
| DATA PORTION | CHANGEABLE | DATA OF CONTENTS OF EACH INFORMATION CODE (NO FIELD, IF CODE IS 00) |

INFORMATION CODE

| LEVEL | 1 | 2 | 3 | 4 | 5 | 6 |
|---|---|---|---|---|---|---|

11 BYTE

| LEVEL 3 | | LEVEL 4 | | LEVEL 5 | |
|---|---|---|---|---|---|
| 0X COPY SYSTEM SERIES | | | | | |
| 00 | WITHOUT SP MODE | 0XX | CONDITION INFO | | |
| | | 1XX | OPERATION MODE INFO | DETAILED CLASSIFICATION | |
| | | 2XX | OPERATION INSTRUCTION INFO | | |
| 01 ~ 08 | SP MODE ROUGH CLASSIFICATION | | SP MODE SMALL CLASSIFICATION | SP MODE DETAILED CLASSIFICATION | |
| 1X COMMUNICATION MACHINE SERIES (FAX etc.) | | | | | |
| 11 | OPERATION MODE | | | | |
| 12 | BKM DATA | | DETAILED CLASSIFICATION | DETAILED CLASSIFICATION | |
| 13 | TEST MODE | | | | |
| 2X | PRINTER SERIES | | DETAILED CLASSIFICATION | DETAILED CLASSIFICATION | |

(a) READING PROCESS (a) WRITING REQUEST PROCESS

FIG. 16

INFORMATION CODE TABLE

| | | INFORMATION CODE | | | CONTENTS |
|---|---|---|---|---|---|
| 1 | 1 | 00 | 001 | 01 | 00 | PAPER END : FIRST CASETTE |
| 1 | 1 | 00 | 001 | 02 | 00 | PAPER END : SECOND CASETTE |
| 1 | 1 | 00 | 001 | 03 | 00 | PAPER END : THIRD CASETTE |
| 1 | 1 | 07 | 502 | 01 | 00 | TOTAL JAM SHEET NUMBER |
| 1 | 1 | 07 | 503 | 01 | 00 | TOTAL JAM DOCUMENT NUMBER |
| 1 | 1 | 00 | 001 | 01 | 00 | PM ALARM OCCURRENCE STATE |
| 3 | 2 | 00 | 001 | 23 | 00 | SC123 OCCURRENCE STATE |
| 3 | 2 | 00 | 001 | 24 | 00 | SC124 OCCURRENCE STATE |
| 3 | 2 | 00 | 005 | 55 | 00 | SC555 OCCURRENCE STATE |
| 3 | 2 | 00 | 009 | 99 | 00 | SC999 OCCURRENCE STATE |
| 5 | 1 | 01 | 001 | 01 | 00 | FIXING TEMPERATURE ADJUST AMOUNT |
| 5 | 1 | 02 | 001 | 01 | 00 | DRUM TEMPERATURE ADJUST AMOUNT |
| 5 | 1 | 03 | 034 | 01 | 00 | EXPOSURE LAMP VOLTAGE ADJUST AMOUNT |

FIG. 17

| 1 | 1 | 00 | 001 | ** | ** |

FIG. 18

| 1 | 1 | 00 | 001 | 01 | 00 | PAPER END: FIRST CASSETTE |
| 1 | 1 | 00 | 001 | 02 | 00 | PAPER END: SECOND CASSETTE |
| 1 | 1 | 00 | 001 | 03 | 00 | PAPER END: THIRD CASSETTE |

FIG. 19

P/I → PPC CONTROLLER

| 02 | ; | 1 | 1 | 00 | 001 | ** | 00 | 00 | EXT |

PPC CONTROLLER → P/I

| 02 | ; | 1 | 1 | 00 | 001 | 01 | 00 | 01 | 0 | ; | 1 | 1 | 00 | 001 | 02 | 00 | 01 | 1 | ; | 1 | 1 | 00 | 001 | 03 | 00 | 01 | 0 | ETX |

FIG. 20A

| 3 | 2 | ** | 001 | 23 | ** |
|---|---|----|-----|----|----|

FIG. 20B

| 3 | 2 | ** | *** | ** | ** |
|---|---|----|-----|----|----|

FIG. 21A

| 3 | 2 | 00 | 0*1 | ** | ** |
|---|---|----|-----|----|----|

FIG. 21B

| 3 | 2 | 00 | *** | ** | ** |
|---|---|----|-----|----|----|

(a) WHEN DATA COMMUNICATION IS POSSIBLE (b) WHEN DATA COMMUNICATION IS IMPOSSIBLE (c) WHEN IMAGE FORMING APPARATUS INCLUDES DATA TO BE SENT (a) WHEN DATA COMMUNICATION IS POSSIBLE
& NO DATA IMAGE FORMING APPARATUS HAS (b) WHEN DATA COMMUNICATION IS IMPOSSIBLE (c) WHEN IMAGE FORMING APPARATUS INCLUDES DATA TO BE SENT (a) WHEN DATA COMMUNICATION IS POSSIBLE (b) WHEN DATA COMMUNICATION IS IMPOSSIBLE (c) WHEN INTERRUPTED DURING DATA COMMUNICATION

IMAGE FORMING APPARATUS SUPERVISING SYSTEM

This application is a continuation of Ser. No. 09/296,497 filed on Apr. 22, 1999.

BACKGROUND OF THE INVENTION

1. Field of the Invention

The present invention relates to an image forming apparatus supervising system having a central control apparatus and a plurality of image forming apparatuses connected to the central control apparatus using a communication network, and in particular, relates to an image forming apparatus supervising system capable of quickly performing data communication therebetween and avoiding an erroneous operation of the image forming apparatuses.

2. Discussion of the Background

In recent years, a variety of image forming apparatus supervising systems have been proposed. Such background image forming apparatus supervising systems generally include a plurality of image forming apparatuses respectively disposed at a plurality of user sites and a central control apparatus (CCA) connected to each of the image forming apparatuses and disposed at a sales dealer or a service center. These image forming apparatuses and central control apparatus form a network.

In such a background image forming apparatus supervising system, the CCA sometimes requires to read some operation data, such as a preset fixing temperature data or the like, stored in a memory of the image forming apparatuses being supervised.

The CCA generally transmits information code data to an image forming apparatus through a communication line and a data communication apparatus (DCA). The image forming apparatus may read data indicated by the information code data from its memory, and transmit the same to the CCA through the communication line and the DCA.

However, such a background image forming apparatus supervising system requires repeating data communication between the CCA and the image forming apparatus a number of times corresponding to a number of data to be read. This results because each data stored in the image forming apparatus requires a different information code data transmitted from the CCA during the data communication. Thus, a data communication time may increase due to an increase in the number of times the data communication is executed.

Further, the image forming apparatus can not perform both a control of data communication executed between the DCA and the image forming apparatus, and a control of its image formation at a same time, when its central processing unit (hereinafter referred to as a CPU) is used to the extent of a maximum performance for the image formation. Thus, if both the controls are forcibly performed in such a case, a problem may occur in the image forming apparatus. Further, even if the CPU has a high performance and can afford to execute both controls at the same time, an inconsistency may arise in an image formation and a problem may occur if the DCA requests the CPU to change a preset image formation condition data during the image formation operation.

SUMMARY OF THE INVENTION

The present invention addresses the above-described and other problems and relates to an image forming apparatus supervising system. The image forming apparatus supervising system includes a central control apparatus, a plurality of image forming apparatuses each having a memory and connected to the central control apparatus with a communication line, and a data communication apparatus connected to the plurality of image forming apparatuses, and the central control apparatus using a communication line.

The image forming apparatus supervising system further includes an information code data transmitting device for transmitting information code data having a plurality of levels, in which character data is respectively included, from the central control apparatus to the image forming apparatus, and a data reading device for reading data corresponding to the information code data from the memory.

The image forming apparatus supervising system further includes a response data transmitting device for transmitting the data read from the memory to the central control apparatus via the data communication apparatus and the communication line.

The central control apparatus may change all character data included in one or more levels lower than a prescribed level of the information code data with particular character data before transmitting the information code data when reading all data in the memory, which accords with character data included in one or more levels higher than the prescribed level of the information code data, and the data reading device reads only data of the memory which accords with the character data not changed with the particular character data when receiving the information code data.

In a further embodiment, an image forming apparatus supervising system may include an information code data transmitting device for transmitting information code data having a plurality of levels, in which character data is respectively included, from the central control apparatus to the image forming apparatuses, a data reading device for reading data corresponding to the information code data from the memory, and a response data transmitting device for transmitting the data read from the memory to the central control apparatus via the data communication apparatus and the communication line.

The central control apparatus may change character data included in a prescribed level of the information code data with particular character data before transmitting the information code data when reading all data in the memory, which accords with character data included in one or more levels higher than the prescribed level of the information code.

Further, the data reading device may read all data in the memory, which accords with the character data included in one or more levels higher than the prescribed level of the information code data.

In a further embodiment, an image forming apparatus supervising system may include a character data changing device for changing all character data included in a level of the information code data, if particular code data is included in the level when the data reading device receives the information code data.

In a further embodiment, an image forming apparatus supervising system may include a data communicating condition determining device for determining if optional data communication between the controller and a personal interface is possible. Further, an image forming apparatus supervising system may include a communication condition information transmitting device for transmitting information to the personal interface, which indicates that the optional data communication is possible when the data communicating condition determining device determines a positive response, and transmits information thereto, which indicates that the optional data communication is impossible when the data communicating condition determining device determines a negative response.

Further, the data communicating condition determining device may always determine if data communication therebetween is possible, and may quickly transmit information indicating a result of the determination to the personal interface.

Further, the data communicating condition determining device may determine if data communication therebetween is possible only when a personal interface requests for dealing of data to the controller, and may quickly transmit information indicating a result of the determination to the personal interface.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 8 is a chart that illustrates an example of a table of a process code to be included in the text data illustrated in FIG. 7;

FIG. 9 is a chart that illustrates an example of a table of an information record to be included in the text data illustrated in FIG. 7;

FIG. 14 is a chart that explains contents of the character included in the third and the fourth levels of the information code illustrated in FIG. 12;

FIG. 16 is a chart that illustrates one example of contents of an information code table stored in a non-volatile RAM or a ROM in the image forming apparatus illustrated in FIG. 5;

FIG. 17 is a chart that illustrates one example of an information code to be received by the image forming apparatus illustrated in FIG. 5;

FIG. 18 is a chart that illustrates information code data and those contents extracted from the information code table illustrated in FIG. 16;

FIG. 19 is a chart that illustrates one example of a structure of text data to be communicated between the personal interface and the PPC controller of the image forming apparatus illustrated in FIG. 5;

FIG. 20A is a chart that illustrates another example of an information code to be received by the image forming apparatus illustrated in FIG. 5;

FIG. 20B is a chart that illustrates one example of an information code, which is to be obtained by changing character of a prescribed level of the information code illustrated in FIG. 20A in the image forming apparatus illustrated in FIG. 5;

FIG. 21A is a chart that illustrates still another example of the information code to be received by the image forming apparatus illustrated in FIG. 5;

FIG. 21B is a chart that illustrates one example of an information code which is obtained by changing a character of a prescribed level of the information code illustrated in FIG. 21A in the image forming apparatus illustrated in FIG. 5:

PREFERRED EMBODIMENTS OF THE PRESENT INVENTION

Figure 1:
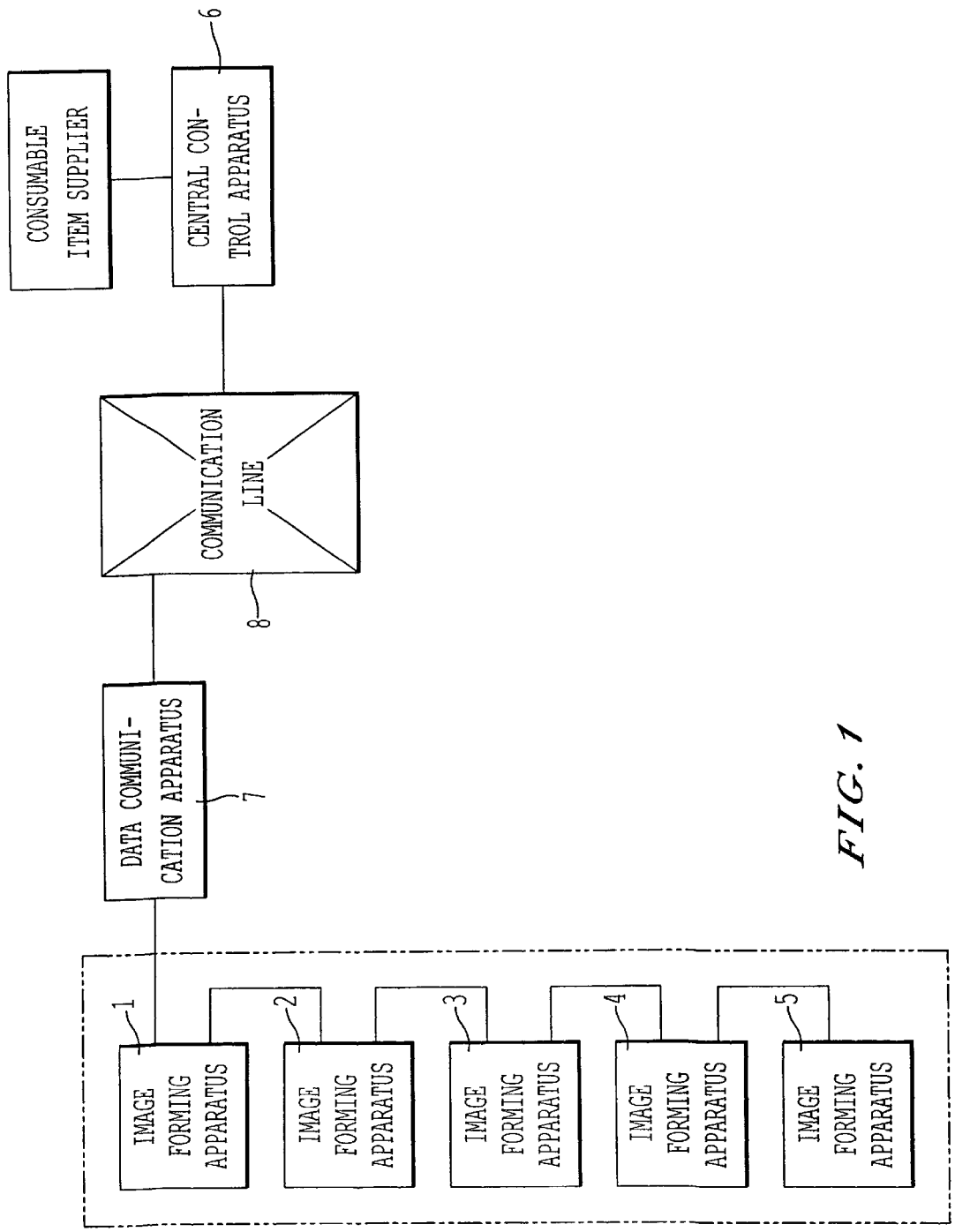
FIG. 1 is a block chart that illustrates an example of a structure of an image forming apparatus supervising system of the present invention.

Hereinbelow, embodiments of the present invention are explained referring to the several figures, wherein like reference numerals designate identical or corresponding parts throughout the several views.

First, an image forming apparatus supervising system for an image forming apparatus group of the present invention is illustrated in FIG. 1 using a block chart. As illustrated in FIG. 1, the image forming apparatus supervising system includes a group of image forming apparatuses 1–5, a data communication apparatus 7, a communication line 8, a central control apparatus 6, and a consumable item supplier 9. The image forming apparatus group includes a plurality of image forming apparatuses 1, 2, 3, 4 and 5, for example.

The data communication apparatus 7 is connected to a communication line 8. The data communication apparatus 7 transfers text data transmitted from the central control apparatus 6 to the image forming apparatuses 1–5, and transfers data generated by any of the image forming apparatuses 1–5 to the central control apparatus 6, through the communication line 8. The data communication apparatus 7 can be operable all day, thereby enabling communication between the central control apparatus 6 and the image forming apparatuses 1–5 even during a time when an electrical power of the image forming apparatuses 1–5 is turned off.

Each of the image forming apparatuses 1–5 is connected to the data communication apparatus 7 in a so-called multi-drop connection manner as illustrated in FIG. 1. Data communication between the image forming apparatuses 1–5 and the data communication apparatus 7 is executed using a serial port in accordance with a data communication standard of RS-485 recommended by the electronic industries association (EIA). Further, the data communication therebetween are executed by polling in which each of the image forming apparatuses 1–5 is polled to determine if data to be transmitted is included therein, and selecting in which text data is communicated between the data communication apparatus 7 and the image forming apparatuses 1–5.

Figure 2:
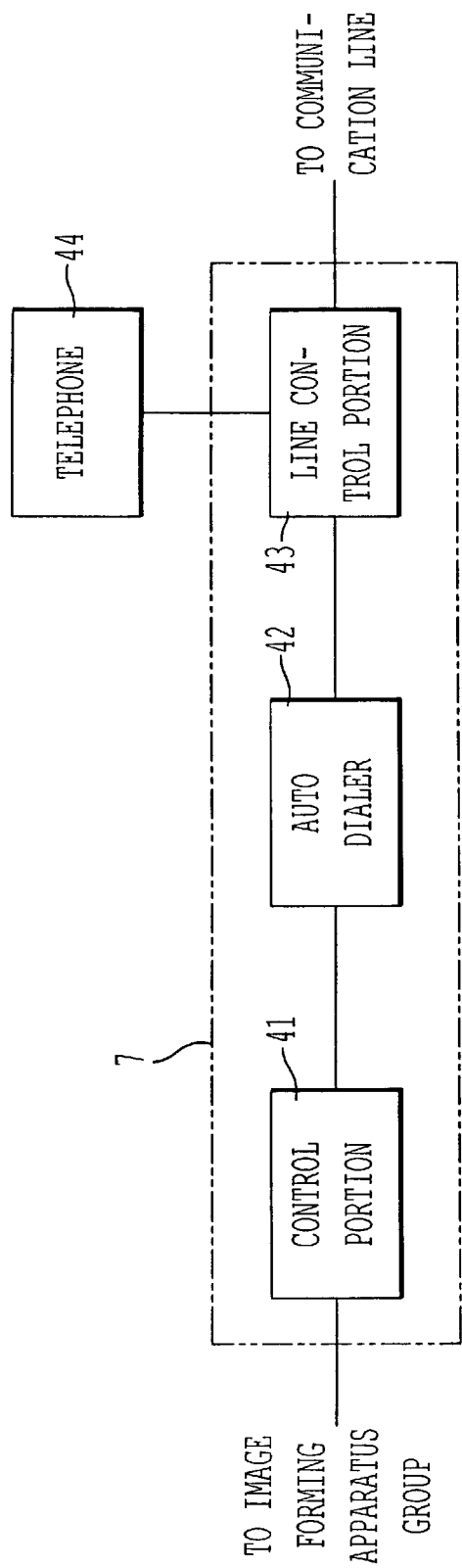
FIG. 2 is a block chart that illustrates an example of a structure of a data communication apparatus illustrated in FIG. 1.

The data communication apparatus 7 is illustrated in detail in FIG. 2 using a block chart. As illustrated in FIG. 2, the data communication apparatus 7 includes a control portion 41, an auto-dialer 42 for automatically dialing a number of the central control apparatus 6, and a line control portion 43 for selectively connecting the communication line 8 either with the image forming apparatuses 1–5 or with a telephone 44.

The control portion 41 has almost the same structure as control devices of the image forming apparatuses 1–5 explained below in detail. Namely, the control portion 41 includes a ROM (read only memory) for storing a control program, a CPU (central processing unit) for executing programs by reading program data from the ROM, and a RAM (random access memory) for tentatively storing data. The control portion 41 further includes a non-volatile RAM (random access memory) backed up by a battery, a serial communication unit, an I/O (input and output) port, a real time clock for providing present time data, and so on.

The non-volatile RAM stores communication data to be communicated between the central control apparatus 6 and the image forming apparatuses 1–5. The communication data includes a plurality of device codes, a plurality of ID codes each for identifying one of the image forming apparatuses 1–5, a telephone number of the central control apparatus 6, data of recalling times in a case of a communication error occurring between the data communication apparatus 7 and the central control apparatus 6, and data representing an interval of a retrial of calling made by the data communication apparatus 7.

Hereinbelow, functions of the image forming apparatus supervising system are briefly explained. The system has three basic functions as described below. First, the central control apparatus 6 may transmit instruction data to the image forming apparatuses 1–5. Second, the image forming apparatuses 1–5 may transfer request data, alarm data, and so on, to the central control apparatus 6 through the data communication apparatus 7. Third, the data communication apparatus 7 can uniquely control each of the image forming apparatuses 1–5.

The first function may include communication of instruction data indicating data reading and data resetting from and to the image forming apparatuses 1–5. The reading and resetting data may include a number of total copysheets used by an image forming apparatus, a number of copysheets used by each of the copysheet cassettes, and a number of copying times of each of the various sized copysheets. The reading and resetting data further includes a number of total times of miss-feedings occurring on any of copysheet feeding paths, a number of miss-feeding times per each of the different sized copysheets, and a number of miss-feedings times occurring at a prescribed position on a copysheet feeding path of an image forming apparatus.

The first function may include communication for setting and reading of operation data. The setting and reading data may include a prescribed amount of voltage, current, resistance, and process timing to be set to an image forming unit, such as a developing unit, of the image forming apparatuses 1–5.

As still another first function, response data is transmitted from the central control apparatus 6 to the image forming apparatuses 1–5, for example, when request or alarm data generated by an image forming apparatus 1–5 is transmitted to the central control apparatus 6.

The above-described plurality of data communications are executed by the data communication apparatus 7 using a selecting operation. The selecting operation hereinafter represents that a prescribed image forming apparatus is selected among the image forming apparatuses 1–5, and data communication is executed thereto.

Figure 3:
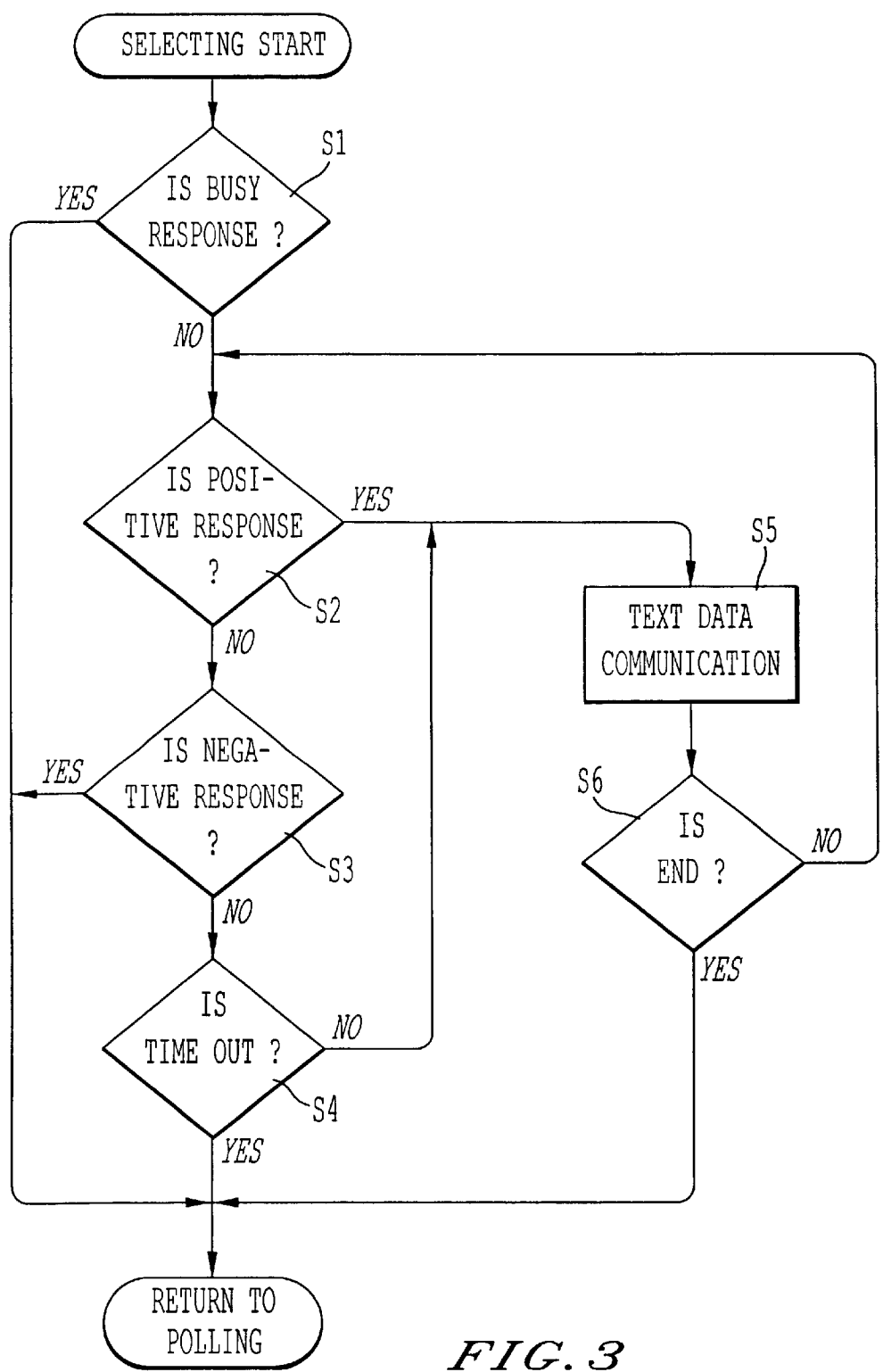
FIG. 3 is a flowchart that illustrates an example of a selecting operation to be executed by the data communication apparatus illustrated in FIG. 2.

As illustrated in FIG. 3, the selecting operation is executed in the below-described manner. First, a prescribed image forming apparatus is selected from among the image forming apparatuses 1–5. Data communication from the central control apparatus 6 to the selected image forming apparatus is then started. Each image forming apparatus 1–5 has a prescribed different device code stored therein beforehand. The data communication apparatus 7 outputs data including a prescribed code indicating execution of a selecting operation, and a prescribed device code indicating a prescribed image forming apparatus, and transmits the data to the image forming apparatuses 1–5 in a serial communication manner using the RS-485 standard. The prescribed image forming apparatus may detect that it is selected when comparing the device code added to the selecting code transmitted from the data communication apparatus 7 with its stored device code.

Hereinbelow, one example of the first function using selecting operations, which is executed when the central communication apparatus 6 includes communication data to be transmitted to the image forming apparatuses 1–5, is explained referring to FIG. 3. When the central communication apparatus 6 has new communication data to be transmitted to the image forming apparatuses 1–5, and if a prescribed image forming apparatus is in the selecting operation due to having data to be transmitted to the central control apparatus 6, the image forming apparatus outputs a busy response signal to the data communication apparatus 7 in step S1. The busy signal is constructed, for example, by at least a prescribed code or a plurality of codes. The data communication apparatus 7 may then stop the selecting operation related to that particular image forming apparatus, and start a polling operation to a next image forming apparatus, when receiving the busy response signal from the image forming apparatus and receiving new data from the central control apparatus 6.

If the prescribed image forming apparatus has no data to be transmitted to the central control apparatus 6 in step S1, i.e. NO in step S1, the image forming apparatus determines if it is possible to respond to a selecting operation related to new data communication in step S2. If an image formation is underway, the image forming apparatus generally can not receive communication data from an external source. If the image forming apparatus can respond to the communication, namely if no image formation is underway, the image forming apparatus outputs a positive response signal, i.e., YES in step S2, to the data communication apparatus 7. The positive response signal may include at least a prescribed code or codes. The image forming apparatus then starts receiving text data from the data communication apparatus 7 in step S5, and stop data communication when it is completed in step S6.

If the positive response is not output in step S2, i.e., NO in step S2, if a negative response is output is determined in step S3. The image forming apparatus outputs a negative response signal to the data communication apparatus 7 in step S3 if it is executing an image formation. The negative response includes at least a prescribed code or codes. The data communication apparatus 7 also stops the selecting operation if the image forming apparatus outputs neither the positive response signal nor the negative response signal within a prescribed time period in step S4. Each of the signals may not be output, i.e., NO in steps S2 and S3, when an electrical power is not supplied to the image forming apparatus, as an example.

Hereinbelow, the second function of the system is explained. The below-described data communications are executed from one of the image forming apparatuses 1–5 to the central control apparatus 6. For example, data indicating some possibility of a problem, which may cause an image forming apparatus to become inoperative, is urgently communicated from an image forming apparatus to the central control apparatus 6 via the data communication apparatus 7. Second, data indicating a consumable item request or a repair request made by operator are also urgently communicated in a same manner. Third, data indicating a status of a counter being close to a prescribed amount is urgently communicated in a same manner.

Fourth, prescribed data is communicated not urgently at a prescribed time in a day, which is preset, and data of which is stored in a same manner as mentioned above. For example, when some possibility of a problem, which does not interfere with a copying operation, has arisen in an image forming apparatus, the image forming apparatus may inform the central control apparatus 6 of the possibility before the problem occurs. To explain this operation in more detail, the central control apparatus 6 may be informed of a status of the copy counter when it just about reaches a prescribed count value, which corresponds to a time for parts to be exchanged with new ones. Further, a fact that parts are used by times just about at prescribed used up times will be communicated. Further, a fact that parts are close to a prescribed maximum durable level at which the sensor does not function will be communicated. The central control apparatus 6 presets the above-described prescribed time or the like, and data thereof are stored in the data communication apparatus 7 until the prescribed time.

Fifth, a fact that a prescribed time period has elapsed from a first use of an image forming apparatus is communicated as non-urgent data communication at a prescribed time in a day from the image forming apparatus to the central control apparatus 6 via the data communication apparatus 7.

The above-described data communication is respectively executed by the polling operation and after that by the selecting operation of the data communication apparatus 7. Such a polling operation is generally executed every time from the data communication apparatus 7 to each of the image forming apparatuses 1–5 so that the data communication apparatus 7 can receive data generated by each of the image forming apparatuses 1–5, and transmit the data to the central control apparatus 6.

Figure 4:
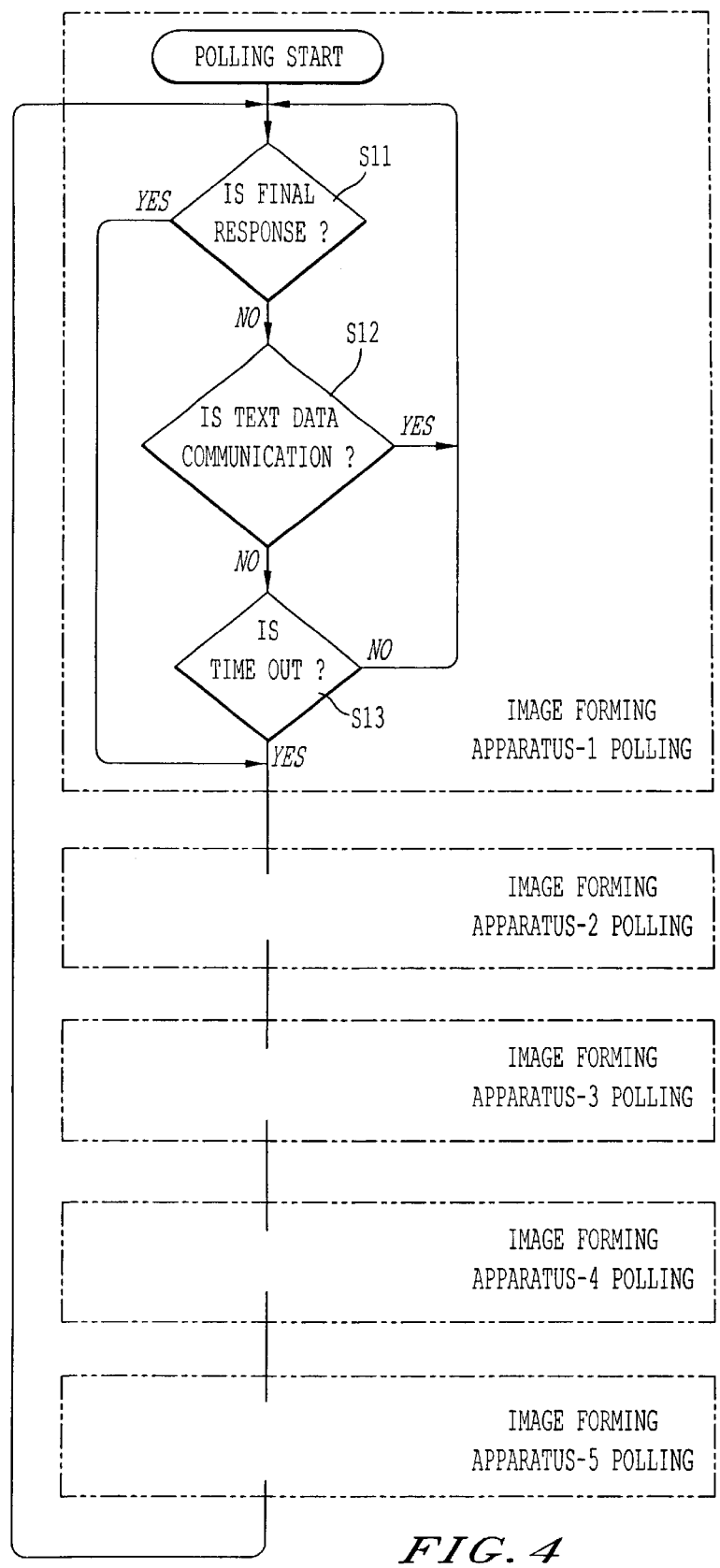
FIG. 4 is a flowchart that illustrates an example of a polling operation to be executed by the data communication apparatus illustrated in FIG. 2.

As illustrated in FIG. 4, the polling operation is executed by designating one of the image forming apparatus 1–5, and determining if each of the respective image forming apparatuses 1–5 has communication data to be transmitted to the central control apparatus 6. When the polling operation is executed, the data communication apparatus 7 transmits the prescribed code data indicating the polling operation and a device code using a serial data communication manner in accordance with the RS-485 standard, for example.

Each of the image forming apparatuses 1–5 compares its own device code allocated thereto beforehand with the above-described device code transmitted from the data communication apparatus 7 during the polling operation. A prescribed image forming apparatus can then recognize being designated by the polling operation, when it determines that its own device code accords with the transmitted device code. The prescribed image forming apparatus then receives the selecting operation, and outputs a code signal indicating, for example, a consumables request to the central control apparatus 6, when having consumable request data as communication data to be transmitted, in step S12. The prescribed image forming apparatus stops such data communication when completing the data communication by outputting a prescribed ending code signal.

To continue the polling operation, the data communication apparatus 7 designates a next image forming apparatus upon receiving the ending code from the previous image forming apparatus in step S11. Further, the data communication apparatus 7 stops the polling operation when a prescribed time has elapsed after its start with respect to a prescribed image forming apparatus, i.e., after a time-out, in step S13. Namely, the data communication apparatus 7 stops the polling operation when the prescribed image forming apparatus does not return correspondence or output an ending code, for example due to an event that an electrical power is not supplied to the image forming apparatus, in step S13. The polling operation is repeatedly executed to each of the image forming apparatuses 1–5 in a prescribed sequence until the selecting operation, which has a priority over the polling operation, is started.

Hereinbelow, the third function of the system, which is executed only by the data communication apparatus 7 as described earlier, is explained in detail. The data communication apparatus 7 reads a total number of counter values from a designated image forming apparatus, and transmits data indicating a result of the determination if data communication from the image forming apparatus is valid in response to data communication therefrom.

The above-described reading of the number of the total counter values can be executed once a day at a prescribed time, for example at noon. If electrical power to be supplied to the image forming apparatus is turned off at the time, the reading operation is executed after the electrical power source starts to be supplied to the prescribed image forming apparatus.

The data communication apparatus 7 has first and second total counter memories therein for respectively storing data of a number of total copy counts. Such a number of the total counts are read during the selecting operation as described above, and are newly stored in the first total counter memory. The data of the number stored in the first total counter memory is renewed when a new number of total counts is read by updating the old stored count value on a later day unless the day is a holiday or a Sunday, for example, because the system generally is not used on such days.

The data newly stored in the first total counter memory can be copied into the second total counter memory at the prescribed time on a prescribed day, e.g. once in a week. The central control apparatus 6 presets the time and the day, and the data thereof are stored in a non-volatile RAM provided in the data communication apparatus 7.

The data communication apparatus 7 transmits the data, indicating the number of the total count values, which are stored in the second total counter memory, to the central control apparatus 6 in either or both of two ways as described below. First, the central control apparatus 6 can access the data communication apparatus 7 to read data of a number of the total counter values at the prescribed time of the day after the data of the total counter values are copied into the second total counter memory. Second, the data communication apparatus 7 can voluntarily transmit data of the number to the central control apparatus 6 by automatically dialing a number of the central control apparatus 6 at a prescribed time in a day after the data thereof are copied into the second total counter memory. The time data for the call are also preset by the central control apparatus 6, and are stored in the non-volatile RAM of the data communication apparatus 7.

Further, the data communication apparatus 7 can have a plurality of other pairs of first and second memories. Those first and second memories can be used in different copy modes such as a mono-color copying mode, a full-color copying mode, and an application copying mode, each of which is employed in a facsimile function, a printer function, and so on. The data of the number of the total counts in each of the different copy modes is stored in a respective first total counter memory, and then copied into a respective second total counter memory.

Figure 5:
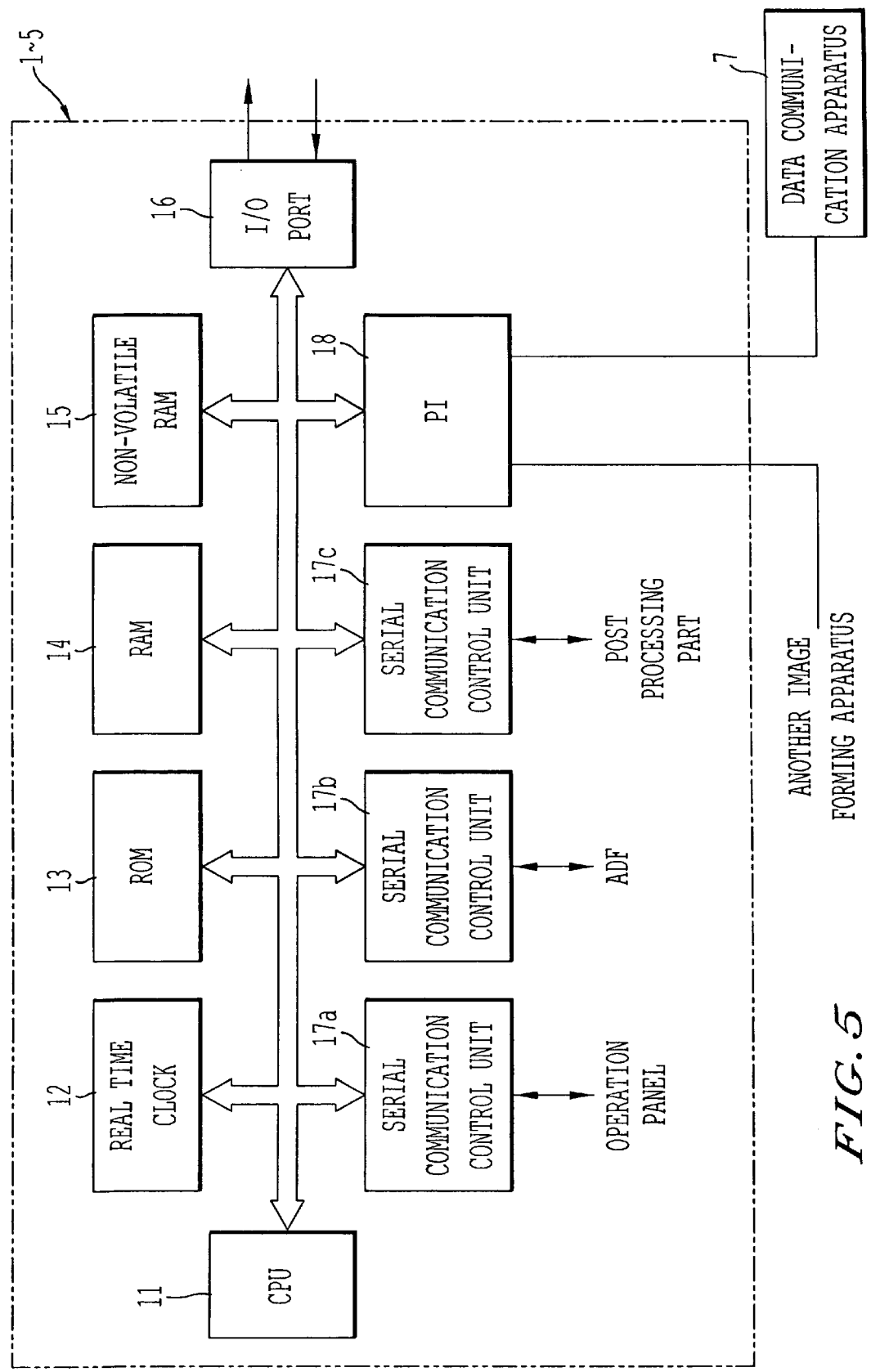
FIG. 5 is a block chart that illustrates an example of a structure of each image forming apparatus illustrated in FIG. 1.

Hereinbelow, a control device disposed in each of the image forming apparatuses 1–5 is explained in detail referring to FIG. 5. The control device of the image forming apparatus includes a CPU 11 (central processing unit 11) for executing a copy control program having an address and data, a control bus 19, and a ROM (read only memory) 13 connected to the CPU 11 through the bus 19 for storing a control program. The control device further includes a RAM (random access memory) 14 for tentatively storing data, and a non-volatile RAM (random access memory) 15 for keeping data stored even when an electrical power source of the system is turned off.

The control device further includes an I/O port 16 connected to the CPU 11 through the bus 19 for communicating data to the data communication apparatus 7. The I/O port 16 is connected to a plurality of loads, for example a driving motor, a solenoid, a clutch, sensors, and so on (not shown).

The control device further includes a plurality of serial communication control units 17a, 17b and 17c for transmitting and receiving signals from and to an operation panel, a document feeding portion, and a post processing portion of the image forming apparatus, respectively. An explanation of the document feeding and post processing portions is omitted, because they are not new. The control device further includes a personal interface 18 that is disposed between the CPU 11 and the data communication apparatus 7, which reduces jobs to be executed by the CPU 11. However, the personal interface 18 may be omitted if the CPU 11 has a sufficient performance to perform tasks of the personal interface 18.

The personal interface 18 performs various functions including: monitoring the polling and selecting operations executed by the data communication apparatus 7; transmitting either the positive or negative response when the selecting operation is executed; determining if data communication between the data communication apparatus 7 and the image forming apparatus is correct; executing a parity check of a frame; requesting re-transmitting of data when an error occurs in the data communication; and judging a header portion of a frame before transmitting. The control device further includes a real time clock 12 connected to the CPU 11 through the bus 19. Thus, the CPU 11 is able to operate in real time by reading the real time clock 12.

Figure 6:
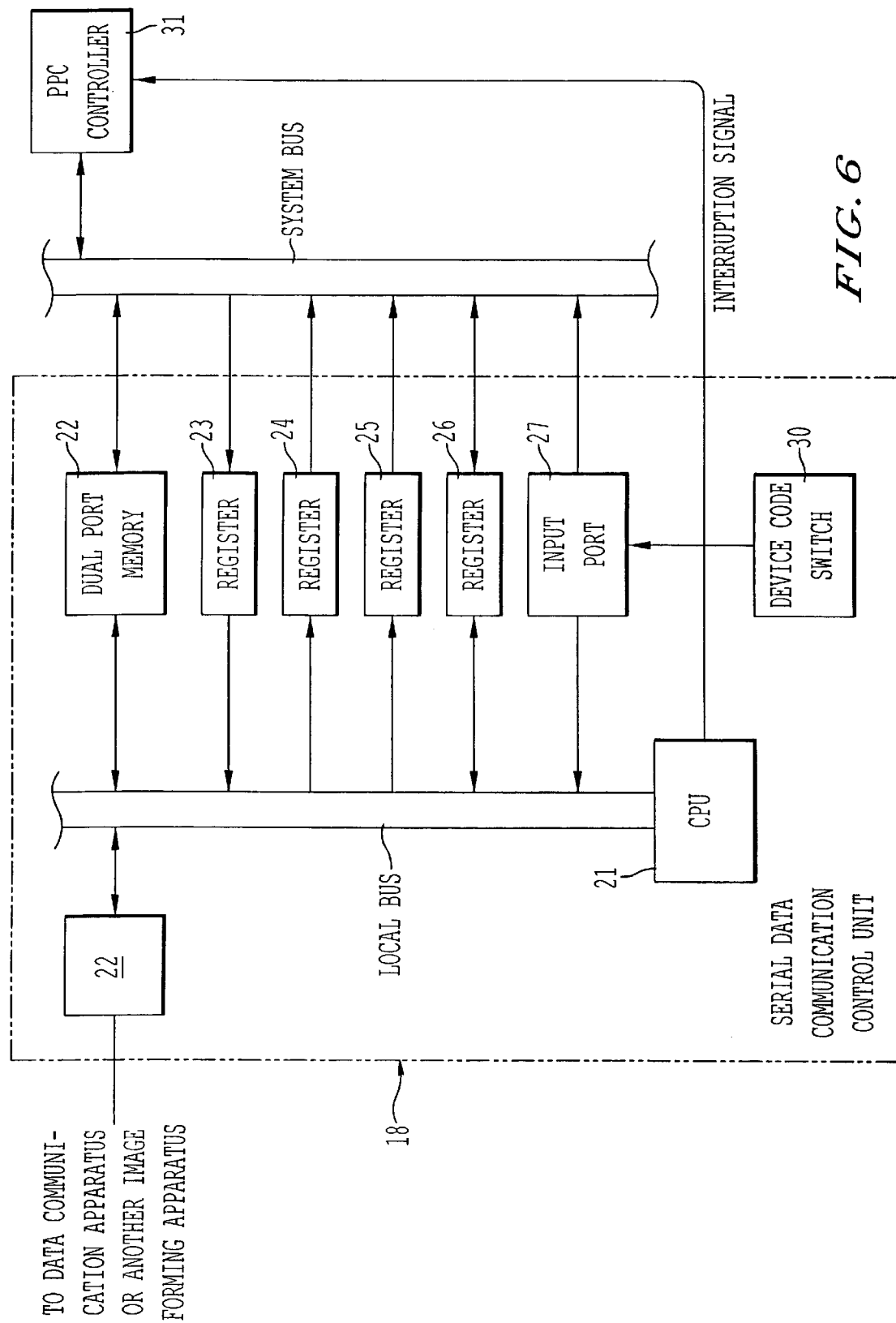
FIG. 6 is a block chart that illustrates an example of a structure of a personal interface included in each image forming apparatus illustrated in FIG. 1.

Hereinbelow, a construction of the personal interface 18 is explained in detail referring to FIG. 6. The personal interface 18 includes a ROM (read only memory) (not illustrated), a RAM (random access memory) (not illustrated), and a one chip CPU (central processing unit) 21 connected to the ROM and the RAM through a local bus line 29. The personal interface 18 further includes a dual port memory 22, a plurality of registers 23, 24, 25 and 26, an I/O (input and output) port 27, and a device code setting switch 30 connected to the I/O port 27.

The dual port memory 22 can be accessed by the one chip CPU 21 and the CPU 11 respectively. The dual port memory 22 transmits and receives text data to and from the image forming apparatuses 1–5. The plurality of registers 23, 24, 25, and 26 are used while the text data is transmitted or received by the dual port memory 22. The device code setting switch 30 sets a plurality of different device codes so that each of the image forming apparatuses 1–5 may be identified. As described earlier, each device code is used when the data communication apparatus 7 executes the polling or selecting operation. The control device of the personal interface 18 further includes a serial communication control unit 28 connected to the data communication apparatus 7 via a line and another personal interface 18 of another image forming apparatus. The PPC controller 31 represents all of the units illustrated in FIG. 5 collectively.

Figure 7:
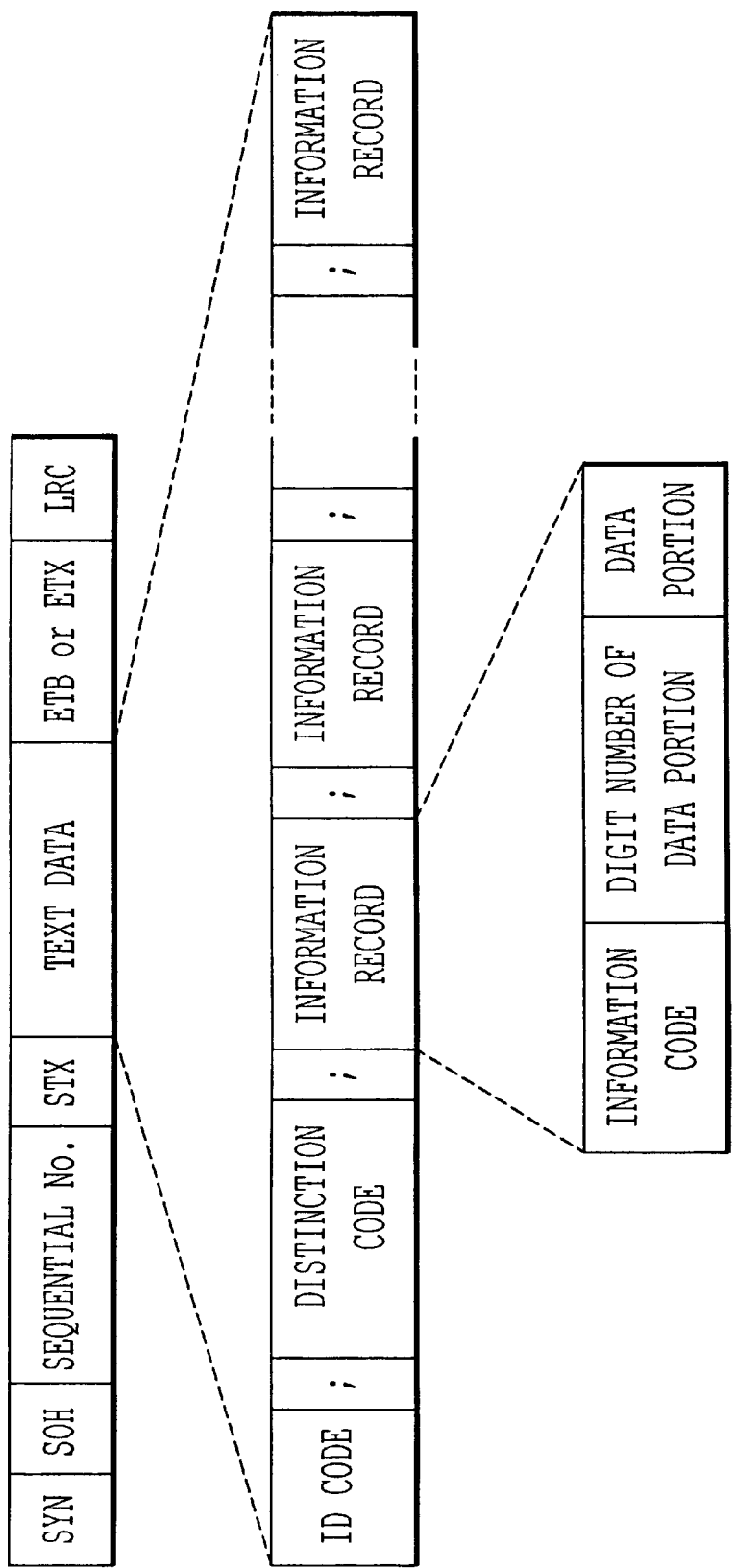
FIG. 7 is a chart that illustrates an example of a structure of text data to be communicated between a central control apparatus and the data communication apparatus illustrated in FIG. 1.

Hereinbelow, a frame to be communicated between the central control apparatus 6 and the data communication apparatus 7 is explained in detail referring to the drawings. First, a structure of a first type of frame is explained referring to FIG. 7. A plurality of the first type of frames are generally communicated therebetween, and accordingly, a plurality of sequential numbers are respectively put thereto. Thus, each sequential number can represent a communication frame number. For example, a number 01 is put to the first frame, and increasing numbers are respectively put to the successive frames. The number increases until 99, and ends at 00.

The frame has text data comprising an ID code, a distinction code, and information records. The ID code identifies both the data communication apparatus 7 and one of the images forming apparatuses 1–5. The distinction code includes a code for indicating contents of process data of a communication (hereinafter referred to as a process code), a sender's code, and a recipient code. The distinction code is predetermined referring to a table as illustrated in FIG. 8. The information record includes an information code, a data portion, and a digit number of data portion. The information record is predetermined referring to a table as illustrated in FIG. 9. A plurality of semicolons are respectively inserted among the ID code, the distinction code, and the information record as data separators.

Figure 10:
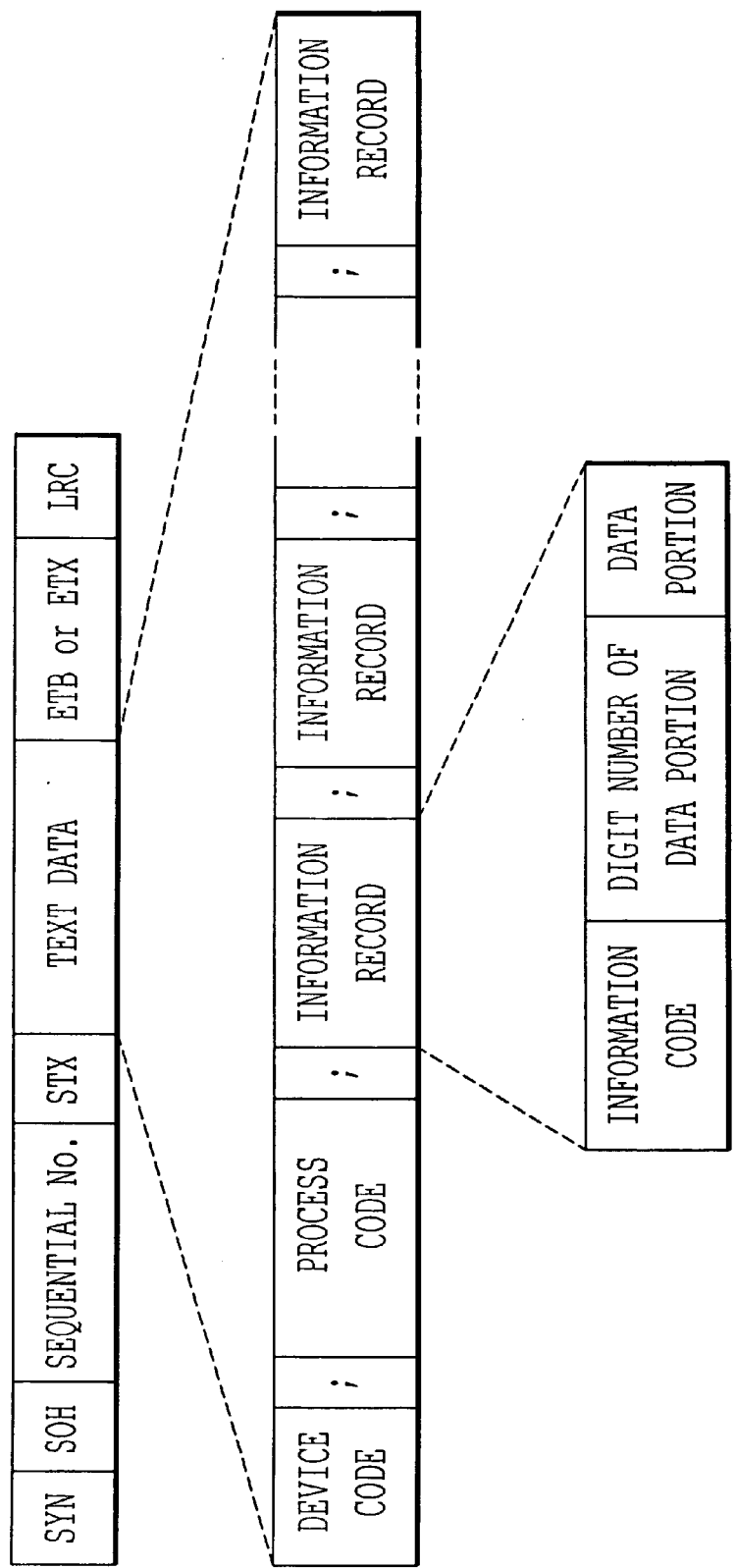
FIG. 10 is a chart that illustrates an example of a structure of text data to be communicated between the personal interface of the image forming and the data communication apparatus illustrated in FIG. 1.

A second type of frame to be communicated between the data communication apparatus 7 and each of the personal interfaces 18 is illustrated in FIG. 10. A device code for identifying a communication to a desired image forming apparatus is put in the frame. As described earlier, a plurality of device codes are preset to the image forming apparatus by the operator using the device code setting switch 30 as illustrated in FIG. 6. The device codes are respectively read from the image forming apparatuses, and are stored in the non-volatile RAM of the data communication apparatus 7. The device codes of the non-volatile RAM are selectively decoded into fewer or larger codes to be used corresponding to a direction of the data communication of the frame between the image forming apparatuses 1–5 and the data communication apparatus 7. The processing code put in the frame represents a kind of contents of the communication as described above, and is constructed by deleting both sender's and recipient codes from the distinction code illustrated in FIG. 9. The process codes are selectively put and deleted thereto and therefrom depending on a transmitting direction of the frame.

Figure 11:
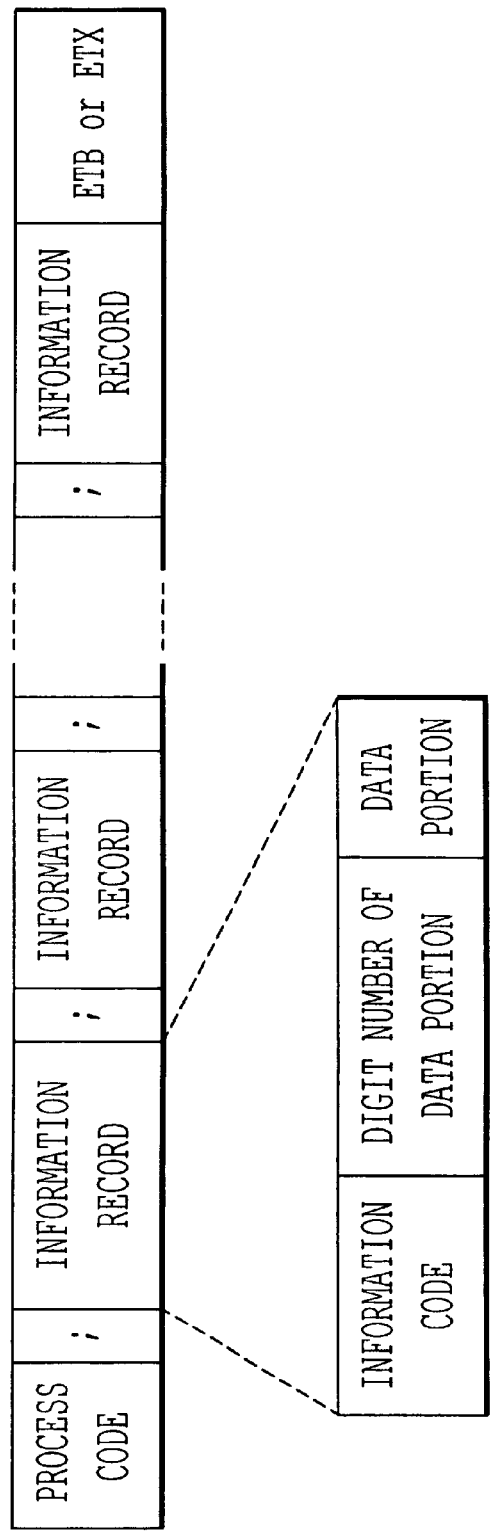
FIG. 11 is a chart that illustrates an example of a structure of text data to be communicated between the personal interface and a PPC controller illustrated in FIGS. 5 and 6.

A third type of frame to be communicated between the personal interface 18 and the image forming apparatus is illustrated in FIG. 11. The third type of frame is constructed by deleting the header, the device code, and a parity portion which is generally used in the second type frame illustrated in FIG. 10.

Figure 12:
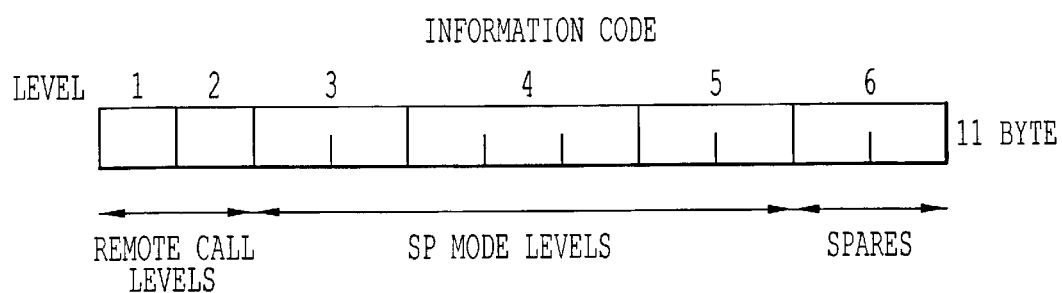
FIG. 12 is a chart that illustrates a plurality of information levels of an information code included in the information record illustrated in FIG. 7, which may respectively include a prescribed character information.

Hereinbelow, a feature of the first embodiment of the present invention is explained referring to FIGS. 12 through 27B. FIG. 12 illustrates one example of an information code included in the information record of the text illustrated in FIG. 10, which is to be communicated between the central control apparatus 6 and the image forming apparatuses 1–5. As illustrated in FIG. 12, the information codes are divided into six levels. Character data used for a remote access as illustrated in FIG. 14 may be included in a first and second level of the information code. Character data indicating a service program mode used, for example by a service person (hereinafter referred to a SP mode), may be included from the third level to the fifth level. The sixth level of the information code may be spaced so as not to be used for data communication, so that it always includes the character "00".

Figure 13:
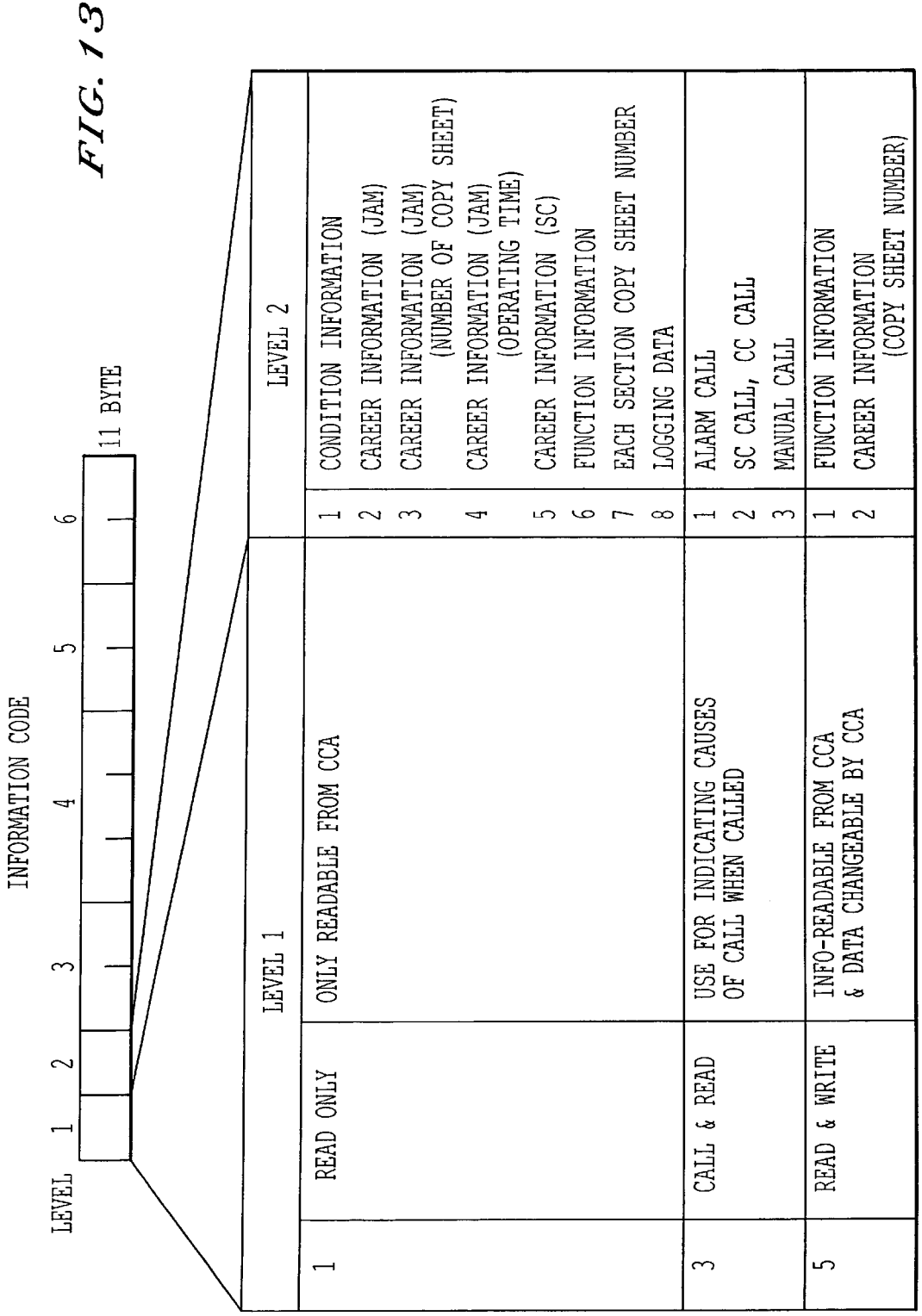
FIG. 13 is a chart that explains contents of the character included in the first and the second levels of the information code illustrated in FIG. 12.

FIG. 13 illustrates contents of information indicated by the character of both the first and second levels, which represents how the central control apparatus 6 may deal with the information code.

FIG. 14 illustrates contents of information indicated by the character from the third to fifth levels, which indicate items representing data setting and reading to and from the image forming apparatus, which is to be executed in a private use of the service person.

Figure 15A:
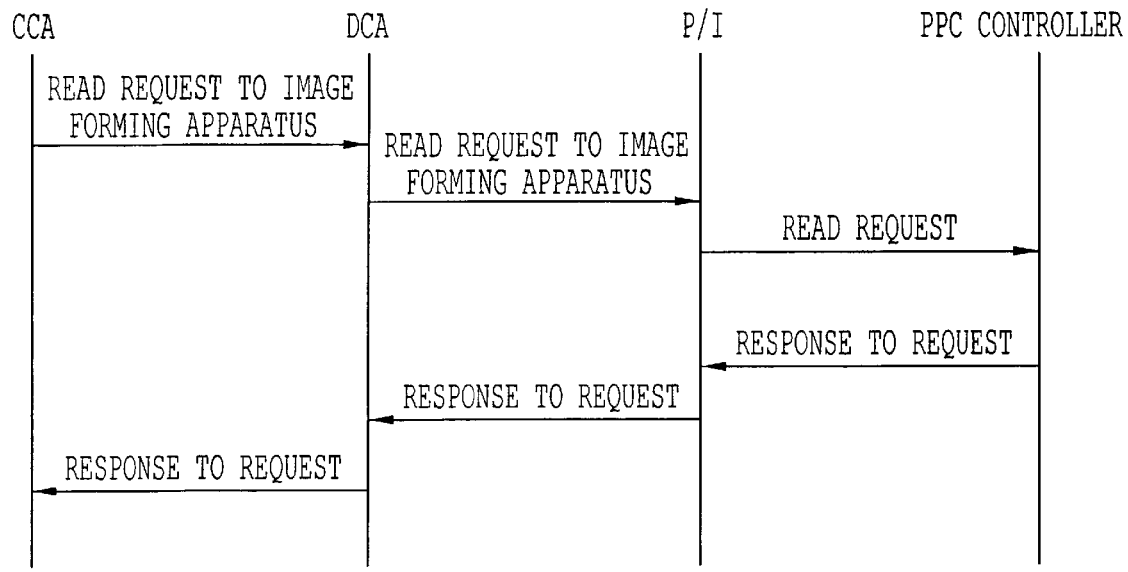
FIGS. 15A and 15B are charts which each illustrate a sequence of data communication to be executed between a central control apparatus and an image forming apparatus including a personal interface and a PPC controller when the central control apparatus gets access to the image forming apparatus.
Figure 15B:
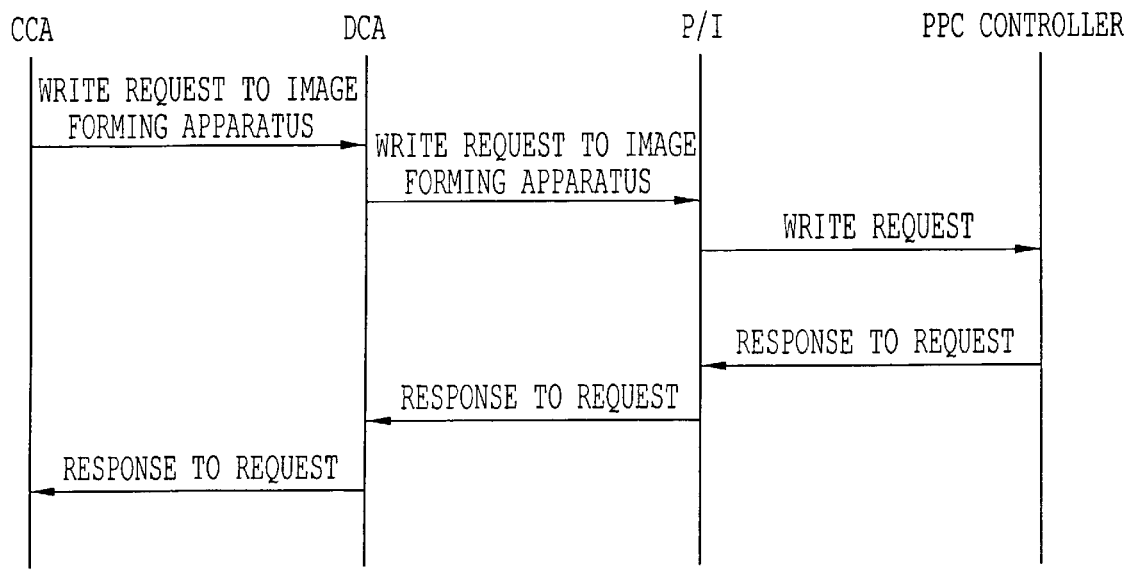

FIGS. 15A and 15B illustrate a sequence of data communication when the central control apparatus 6 gets access to the image forming apparatuses 1–5. A Reading Request of FIG. 15A illustrated therein represents a request for reading of data such as logging data, a variety of preset image forming operation data, output data of a variety of sensors, and so on, from the non-volatile RAM 15 of the image forming apparatuses 1–5. A Write Request represents a request for overwriting, for example, the preset image forming operation data with data transmitted from the central control apparatus 6.

Data communication among the central control apparatus 6, the data communication apparatus 7, and the image forming apparatuses 1–5 when one of the above-mentioned requests is made is now explained. First, a data reading process is explained referring to FIG. 15A. The central control apparatus 6 may transmit prescribed text data having a data reading request by dialing the data communication apparatus 7 connected to a desired one of image forming apparatuses 1–5. The data communication apparatus 7 may receive the request data from the central control apparatus 6.

The data communication apparatus 7 may transfer the request data to the prescribed PPC controller 31 of each of the image forming apparatuses 1–5 through their personal interfaces 18. Thus, each of the image forming apparatuses 1–5 may receive the request data. Each image forming apparatus 1–5 may read data corresponding to an information code of an information record of the request data from the non-volatile RAM 15, which may be a response data to be transmitted to the central control apparatus 6 by return through the data communication apparatus 7 and the personal interface 18.

Next, a data writing process is explained referring to FIG. 15B. When text data includes a data writing request, the image forming apparatus (PPC controller) may write prescribed data included in a data portion of the information code into the non-volatile RAM 15. A response to the write request from the central control apparatus 6 may be transmitted to the data communication apparatus 7 via the personal interface 18 and the data communication apparatus 7 after the writing request has been issued. A cycle of data dealing is completed when the data communication apparatus 7 transfers response data to the central control apparatus 6. FIG. 16 illustrates one example of an information code table stored in either the ROM 13 or the non-volatile RAM 15. The information code table includes a plurality of information codes and contents of each information code.

Hereinbelow, one example of a data dealing operation of the image forming apparatus supervising system is explained in detail. A first example of the image forming apparatus supervising system is explained referring to FIGS. 17 through 19. In this example, a CPU and other prescribed devices of the central control apparatus 6 (not illustrated) may function as an information transmitting device. Further, the CPU 11 and other prescribed devices of the image forming apparatuses 1–5 may function as both a data reading device and a data transmitting device.

When all operation parameter data having prescribed same character data at a level or levels higher than a prescribed level is to be read from each non-volatile RAM 15, the central control apparatus 6 may create an information card such that prescribed character data of a level or levels lower than the prescribed level of the information card is replaced with a wild card or wild cards. The prescribed character data in the higher level can be data indicating read only and a total count of a paper jam, for example. The wild card data can be generated by the central control apparatus 6 and put to the prescribed level or levels of the information code as explained later in detail. The central control apparatus 6 may transmit text data having the information code to each of the image forming apparatuses 1–5 via the communication line 8 and the data communication apparatus 7 to read the above-mentioned prescribed operation parameter data. In this example, the text data including information code illustrated in FIG. 17 may be transmitted from the central control apparatus 6. The wild card data may include, for example, the asterisks as illustrated in FIG. 17.

Each of the image forming apparatuses 1–5 may read all operation parameter data corresponding to levels of the information code except for the level having the asterisk when receiving the information code. Namely, the image forming apparatuses 1–5 may extract all information codes from the information code table illustrated in FIG. 10, which includes characters corresponding to the characters except as indicated by the asterisks of the information code.

Thus, the image forming apparatuses 1–5 may check all character included in from the first to the sixth level of the information code when receiving the text data. In this example, a variety of information codes having characters "1" in the first and second levels, a character "00" in the third level and a character "00" in the fourth level as illustrated in FIG. 16 are extracted from the information code table when the information code table is referenced.

Each of the image forming apparatuses 1–5 may read the operation data, for example, indicating paper end conditions of a first, second, and third paper cassettes from the non-volatile RAM 15 in a prescribed order corresponding to each character. Each of the image forming apparatuses 1–5 (each of the CPUs 11) may generate text data as a response based on information read from the non-volatile RAM 15 corresponding to each character, and transmit response data to the central control apparatus 6 via both the data communication apparatus 7 and the communication line 8.

FIG. 19 illustrates one example of contents of text data to be communicated between the personal interface 18 and the PPC controller 31. According to the above-mentioned image forming apparatus supervising system, data communication between the central control apparatus 6 and image forming apparatuses 1–5 can be simplified due to usage of an asterisk, and accordingly, data communication can be shortened.

Hereinbelow, a first modification of the above-mentioned image forming apparatus supervising system of the present invention is explained referring to drawings including FIGS. 20A and 20B. In this example, the CPU and other devices of the central control apparatus 6 may function as an information code transmitting device. Further, the CPU 11 and other devices of the image forming apparatuses 1–5 may function as a data reading device and a data transmitting device. To read all operation data having a same character or characters in a level or levels higher than a prescribed level from the non-volatile RAM 15, the central control apparatus 6 may create text data in a state that a character of a prescribed level of information code is replaced with a wild card by utilizing an asterisk. The central control apparatus 6 may transmit the text data to each of the image forming apparatuses 1–5 via both the data communication apparatus 7 and the communication line 8. In this example, text data including the information code illustrated in FIG. 20A may be transmitted, for example.

Each of the image forming apparatuses 1–5 may read all data having same characters with the information code in levels higher than the wild card when receiving the information card. Namely, each of the image forming apparatuses 1–5 may extract all information codes from the information card table illustrated in FIG. 16, which include characters corresponding to the information code in levels higher than the asterisk.

Each of the image forming apparatuses 1–5 may check a character of the first level of the information code received. Each of the image forming apparatuses 1–5 may replace characters from the second to the sixth levels into wild cards, if the character of the first level includes the wild card. If the character of the first level does not include the wild ward, each of the image forming apparatuses 1–5 may check characters of following levels, and replace a character or characters of a level or levels higher than a prescribed level, if it recognizes the wild card in the prescribed level.

In this example, since the third level includes the wild card as illustrated in FIG. 20A, the information code received may change its characters of levels higher than the third level as illustrated in FIG. 20B. Before reading of the prescribed data from the non-volatile RAM 15, each of the image forming apparatuses 1–5 may retrieve the information codes having a character "3" at the first level and having a character "2" at the second level. The image forming apparatuses 1–5 may extract the corresponding information codes, and read corresponding operation data from the non-volatile RAM 15 in a prescribed order. The image forming apparatuses 1–5 may create text data as response data based on the operation data read.

According to the above-mentioned second modification, the data communication can be simplified due to utilizing and placing of an asterisk. Further, since each image forming apparatus does not require to check all characters of the information code received, retrieval of the prescribed data can be simplified, and its operation time can be shortened. Thus, a data communication time can be shorter than in the first modification.

Hereinbelow, a third modification of the above-mentioned image forming apparatus supervising system is explained referring to drawings including FIGS. 21A and 21B. In this example, the CPU and other devices of the central control apparatus 6 may function as an information code transmitting device. Further, the CPU 11 and other devices of the image forming apparatuses 1–5 may respectively function as a data transmitting device and a data reading device.

To read operation parameter data having one or more same characters in a level or levels higher than a prescribed level from the non-volatile RAM 15, the central control apparatus 6 may create an information code in a manner such that one or more wild cards are included in levels lower than the prescribed level. The central control apparatus 6 may alternatively create an information code having a wild card in the prescribed level in this case. The central control apparatus 6 may transmit the text data to each of the image forming apparatuses 1–5 via both the communication line 8 and the data communication apparatus 7. In this example, the text data may include the information code illustrated in FIG. 21A.

Each of the image forming apparatuses 1–5 may check each level of the information code, and determine if a level includes a wild card among characters when receiving the text data. If the level includes the wild card among the characters, each of the image forming apparatuses 1–5 may replace all the characters with wild cards.

In this example, since the fourth level includes a wild card only at its second place as illustrated in FIG. 21A, each image forming apparatus may replace the characters of the first and third places of the fourth level with wild cards to fill that level with the wild cards as illustrated in FIG. 21B.

Then, the image forming apparatuses 1–5 may execute data dealing in almost a same manner as mentioned earlier.

According to the third modification, the advantages as mentioned in the first and second modifications may be obtained. Further, data may be surely read from the non-volatile RAM 15.

Hereinbelow, a second embodiment of the present invention is explained referring to FIGS. 22 through 27.

Figure 22:
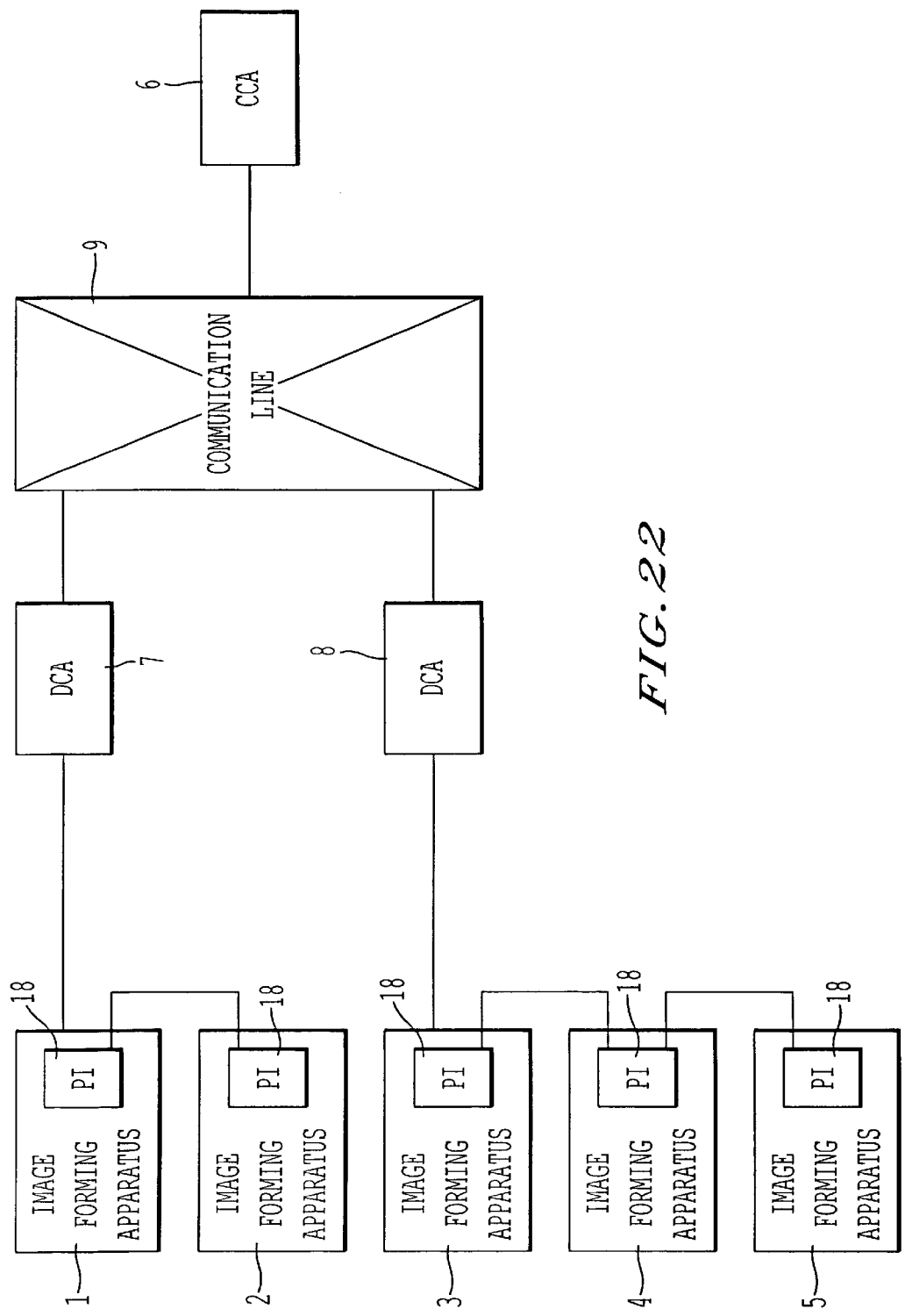
FIG. 22 is a block chart that illustrates another example of a structure of an image forming apparatus supervising system of the present invention.
Figure 23A:
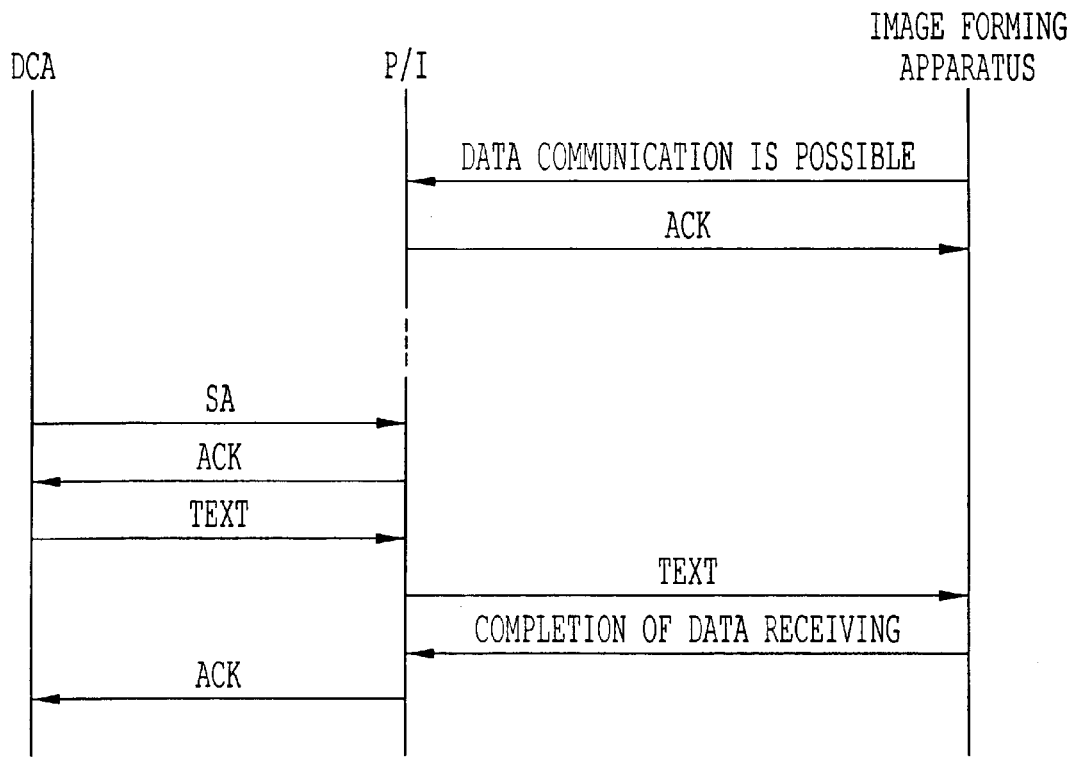
FIGS. 23A, 23B, and 23C are charts which illustrate a sequence of data communication during a selecting operation executed by a data communication apparatus.
Figure 23B:
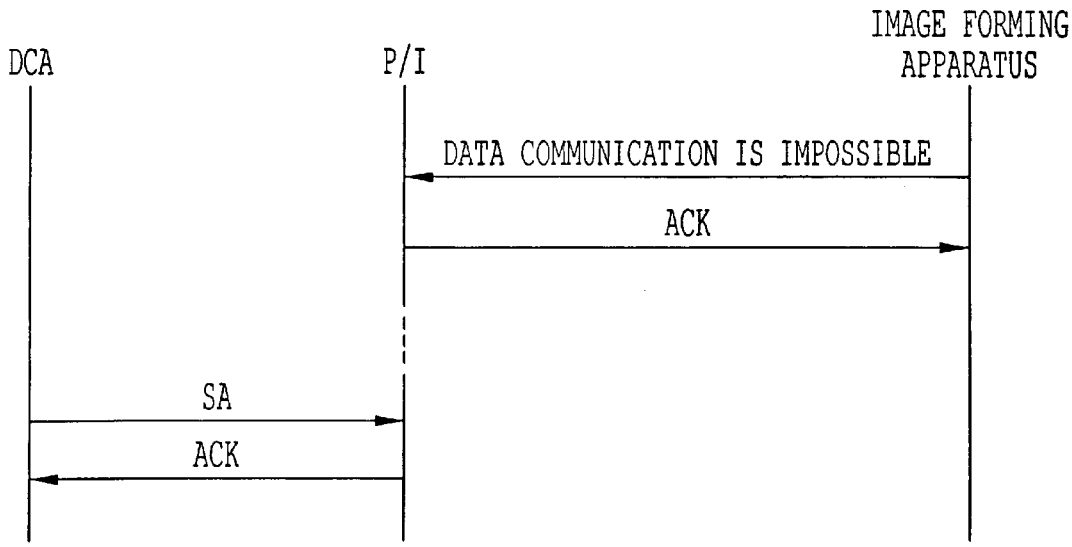
Figure 23C:
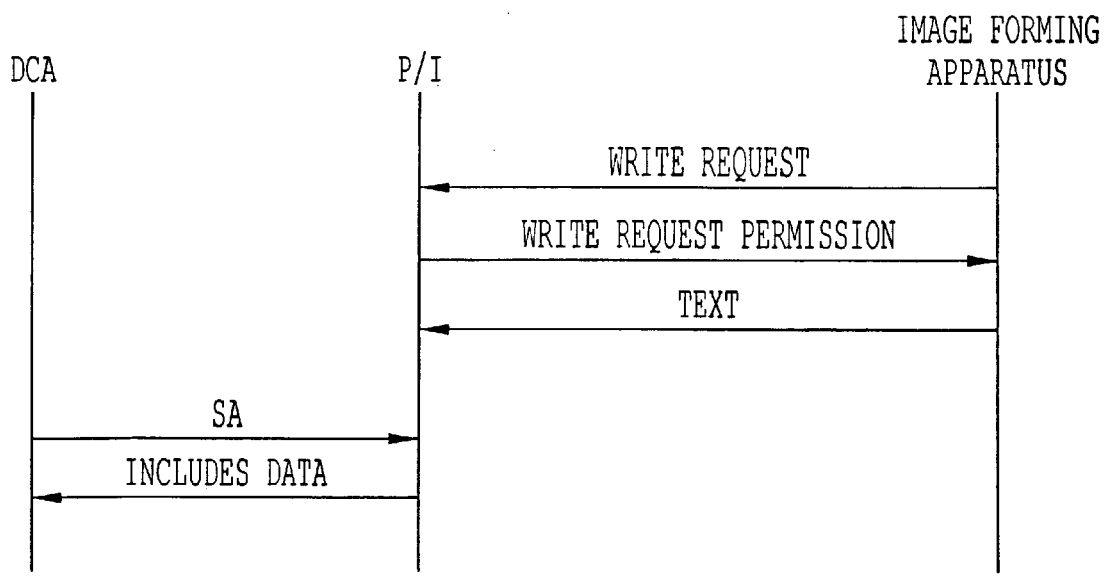

In this embodiment, a pair of data communication apparatuses 7 and 17 are employed between a plurality of image forming apparatuses 1–5 and a central control apparatus 6 to respectively treat a prescribed number of image forming apparatus as illustrated in FIG. 22. FIGS. 23A, 23b and 23C respectively illustrates a sequence of data communication between a data communication apparatus 7 or 17 and a prescribed image forming apparatus.

Each personal interface (P/I) 18 may have a unique own device code. The data communication apparatus 7 and 17 may transmit a prescribed code (SA) indicating a selecting function and a device code indicating an image forming apparatus, according to its personal interface 18, to be selected through a serial data communication interface RS-485.

Each personal interface 18 may compare the device code following the prescribed code (SA) with its own device code when receiving the prescribed code (SA). Further, each personal interface 18 may recognize that it is selected when both device codes accord with each other.

When optional data communication is available between the personal interface 18 and the prescribed image forming apparatus, the below described data communication is executed as illustrated in FIG. 23A. First, the personal interface 18 may transmit code data (ACK) to the corresponding data communication apparatus 7 or 17, if the personal interface 18 receives communication data indicating that optional data communication is possible from the image forming apparatus, when the corresponding image forming apparatus is selected in the selecting operation (SA). The optional data communication may be possible, only if an image formation of the image forming apparatus is stopped so that the CPU 11 or the like can avoid receiving an overload.

The data communication apparatus 7 and 17 may transmit text data (TEXT) indicating a request, for example, of writing or reading of data such as an image forming condition data (operation data?) to the image forming apparatus, when receiving the data (ACK) from the personal interface 18. The personal interface 18 may transfer the text data (TEXT) to the image forming apparatus, after receiving of the text data from the data communication apparatus 7 or 17.

The image forming apparatus may transmit completion code data indicating completion of receiving of data to the corresponding personal interface 18, when having completed receiving of the text data from the personal interface 18. The corresponding personal interface 18 may transmit the data code (ACK) to the data communication apparatus 7 or 17, and wait for a polling operation, when receiving the completion code data from the image forming apparatus.

If the optional data communication is impossible between the personal interface 18 and each of the image forming apparatuses, the below described operation is executed as illustrated in FIG. 23B. A prescribed personal interface 18 may transmit negative code data (NAK) to the data communication apparatus 7 or 17 when receiving communication NG code data indicating that optional data communication from the corresponding image forming apparatus is impossible, and when selected in the selecting operation (SA).

The data communication apparatus 7 and 17 may stop the selecting operation, or retry the selecting operation a prescribed time period after it stops the selecting operation, when receiving the code data (NAK) from the corresponding personal interface 18. In this occasion, no data communication is executed between the personal interface 18 and the image forming apparatus.

If each of the image forming apparatuses 1–5, and more precisely each respective PPC controller 31, has some communication data to be transmitted, the below described data communication is executed as illustrated in FIG. 23C.

A prescribed personal interface 18 may transmit code data indicating existence of communication data in the image forming apparatus to the corresponding data communication apparatus 7 or 17 when selected (SA). Namely, the personal interface 18 receives text data from the prescribed image forming apparatus in response to a writing request of the image forming apparatus to the personal interface 18 before transmitting the code data.

After the personal interface has transferred all of above-mentioned code data to the data communication apparatus 7 or 17, the personal interface 18 may wait for a polling operation. Further, the corresponding data communication apparatus 7 or 17 may start the polling operation against the personal interface 18 after the stop of its selecting operation. If a personal interface 18 corresponding to a device code output by the data communication apparatus 7 or 17 transmits neither code data (ACK) nor (NAK) due to deenergization of an electrical power supply and so on, the data communication apparatus 7 or 17 may stop the selecting operation a prescribed time after the start of selecting.

Figure 24A:
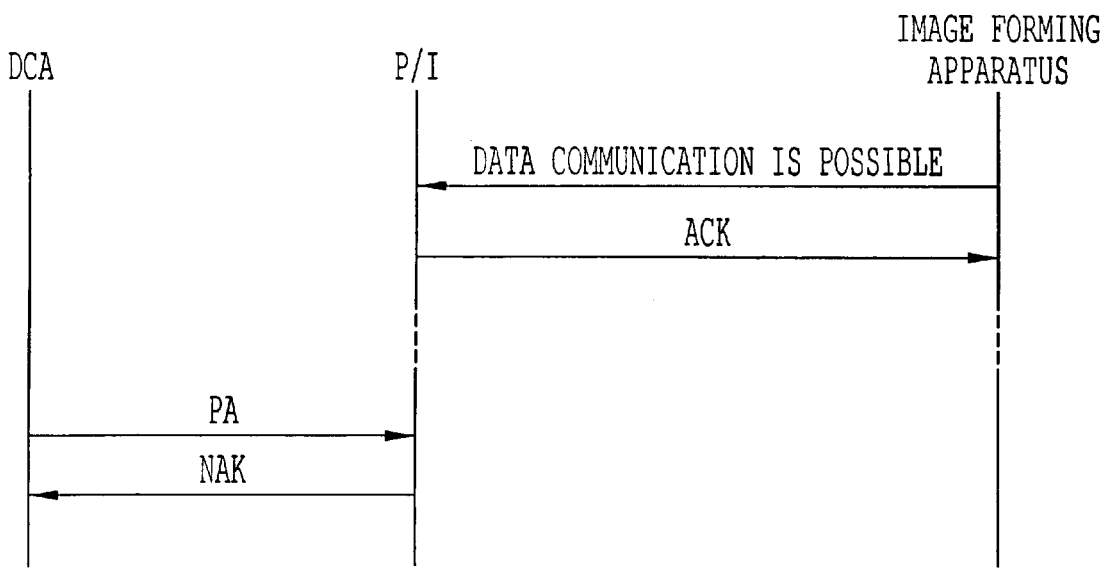
FIGS. 24A, 24B, and 24C are charts which illustrate a sequence of data communication during a polling operation executed by a data communication apparatus.
Figure 24B:
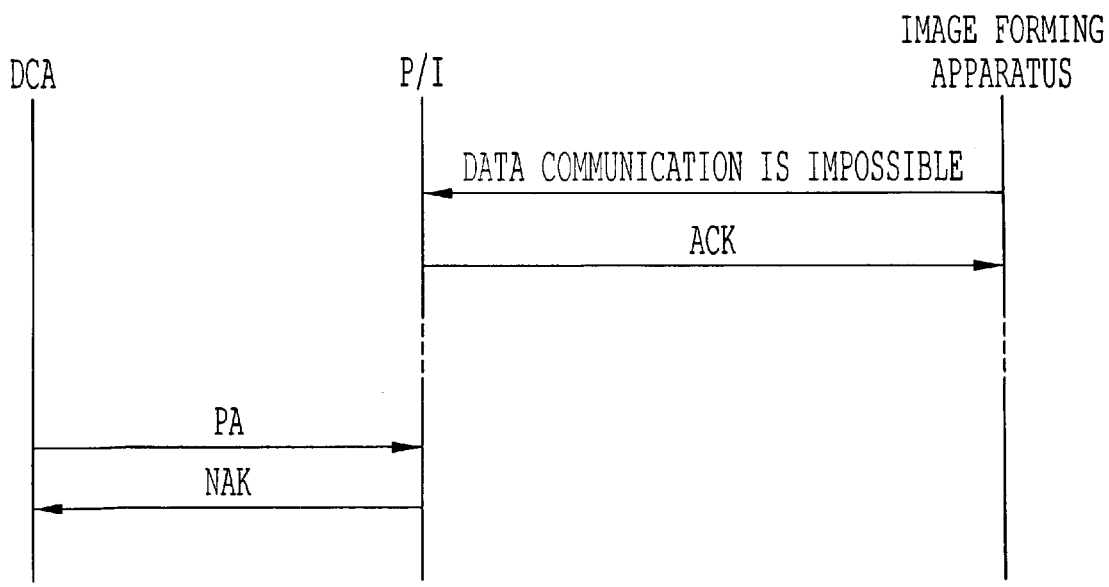
Figure 24C:
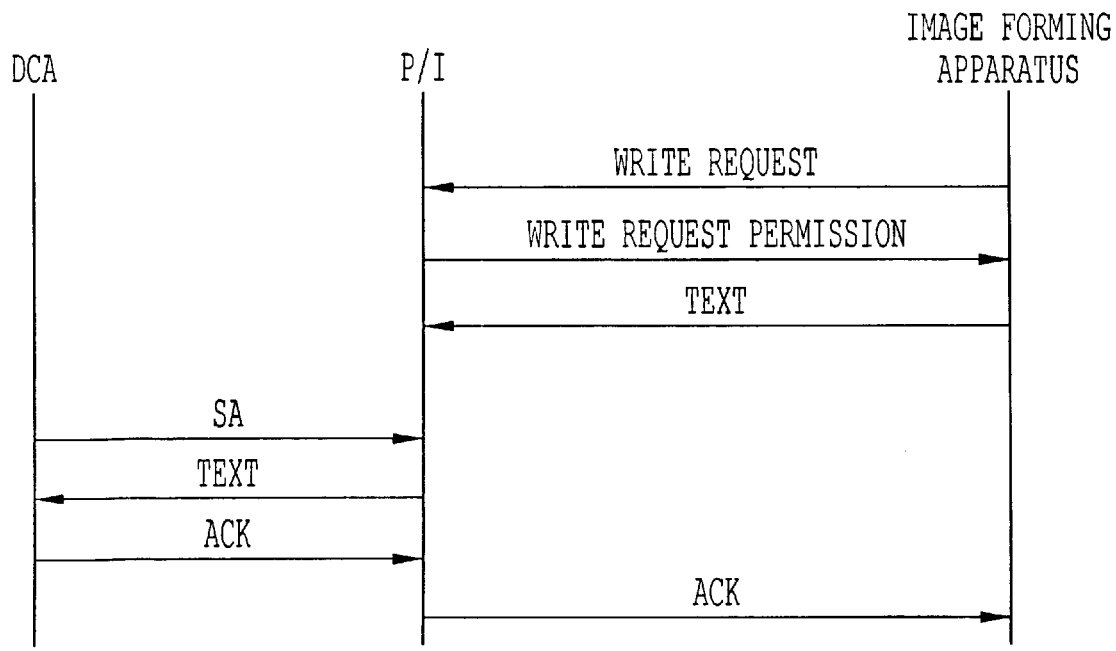

FIGS. 24A, 24B, and 24C respectively illustrate a data communication sequence for explaining the below described polling operations by the data communication apparatus 7 or 17. The polling operation may function such that each image forming apparatus is designated in a prescribed order, and determine if each image forming apparatus includes some data to be transmitted.

The data communication apparatus 7 or 17 may transmit a prescribed code (PA) indicating a prescribed polling function, and a device code indicating a prescribed image forming apparatus to be selected through the serial data communication interface RS-485. Each personal interface 18 may compare the device code following the code PA with its own device code after receiving the code PA. Each personal interface 18 may recognize that a polling operation is executed if both device codes accord with each other.

First, as illustrated in FIG. 24A, data communication to be executed when an optional data communication between the personal interface 18 and the corresponding image forming apparatuses 1–5, more precisely a respective PPC controller 31, is possible, and when the image forming apparatus has no data to be transmitted is explained referring to FIG. 24A. Each personal interface 18 may transmit code data (NAK) indicating a negative response to the corresponding data communication apparatus 7 or 17 when receiving code data indicating that optional data communication is impossible from the corresponding image forming apparatus, and when no communication data to be transmitted exists in the corresponding image forming apparatus when the polling operation is executed.

The data communication apparatus 7 and 17 may stop the polling operation once, and start the polling again a prescribed interval after the stop of the polling operation, when receiving code data (NAK) from the personal interface 18. In this moment, no data communication is performed between the personal interface 18 and the image forming apparatus.

Data communication to be executed when optional data communication between a prescribed personal interface 18 and a corresponding image forming apparatus, and more precisely a corresponding PPC controller 31, is impossible is explained referring to FIG. 24B. The personal interface 18 may transmit code data (NAK) to the corresponding data communication apparatus 7 or 17 when receiving code data indicating that optional data communication is impossible from the corresponding image forming apparatus, and when the polling operation (PA) is executed.

The data communication apparatus 7 or 17 may stop the polling operation and then start it again after one cycle of polling for all of the image forming apparatuses 1–5 has been completed, when receiving code data (NAK) from the corresponding personal interface 18. At this moment, no data communication between the personal interface 18 and the image forming apparatus may be performed.

Data communication to be executed when one of the image forming apparatuses 1–5, more precisely one of their respective PPC controllers 31, has some communication data to be transmitted is now explained referring to FIG. 24C.

A prescribed image forming apparatus may transmit code data indicating a request for writing of data to a corresponding personal interface 18 when having code data to be transmitted. The personal interface 18 may transmit code data indicating permission of writing of data to the corresponding image forming apparatus when receiving the data writing request data from the corresponding image forming apparatus. The image forming apparatus may transmit text data (TEXT) to the corresponding personal interface 18 when receiving the data writing permission data.

The personal interface 18 may wait for a polling operation after receiving the text data (TEXT) from the corresponding image forming apparatus. The personal interface 18 may transfer the text data (TEXT) to the corresponding data communication apparatus 7 or 17 when the polling operation (PA) is performed.

The data communication apparatus 7 or 17 may transmit code data (ACK) indicating a positive response to the personal interface 18 when receiving the text data (TEXT) from the corresponding personal interface 18.

The personal interface 18 may transmit code data (ACK) indicating completion of data transmission to the corresponding image forming apparatus after receiving the code data (ACK) indicating a positive response.

During the above-mentioned polling operation, the data communication apparatus 7 or 17 may stop polling for a prescribed time interval after which the corresponding personal interface 18 transmits neither the code data (NAK) indicating a negative response nor code data (ACK) indicating a positive response thereto due to deenergization of the electrical power supply, for example.

Hereinbelow, an operation of the image forming apparatus supervising system of the second embodiment is explained in detail. First, determination if data communication between the personal interface 18 and the image forming apparatus is possible is explained referring to drawings including FIGS. 25A, 25B, and 25C. Each of the PPC controllers 31 including respective CPUs 11 of the image forming apparatuses 1–5 may function as a checking device for checking a status of the personal interface 18 and the image forming apparatus, and communication status data transmitting device for transmitting communication status data.

Figure 25A:
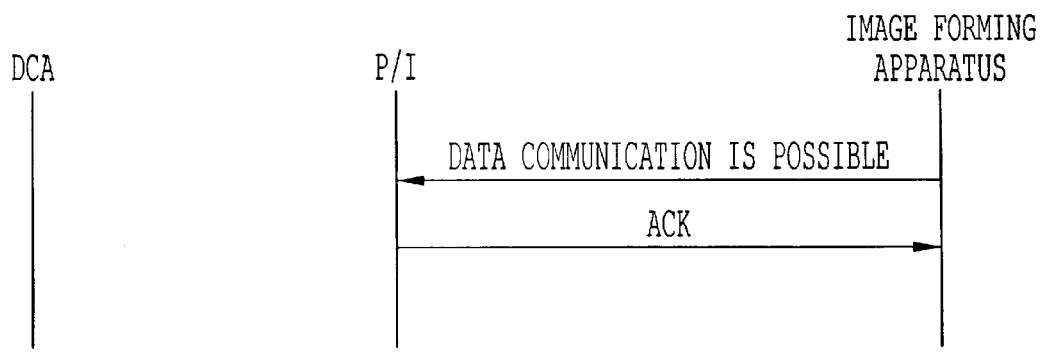
FIGS. 25A, 25B, and 25C are charts which illustrate one example of a sequence of communication for determining if data communication between a personal interface and a controller of a prescribed image forming apparatus illustrated in FIG. 22 is possible.

First, as illustrated in FIG. 25A, data communication to be executed when optional data communication between the personal interface 18 and the image forming apparatus, namely its PPC controller 31, is impossible, is hereinbelow explained.

The prescribed image forming apparatus may determine if optional data communication between the image forming apparatus and the corresponding personal interface 18 is possible. Further, the image forming apparatus may transmit code data indicating that the optional data communication between the image forming apparatus and the corresponding personal interface 18 is possible to the corresponding personal interface 18, if the determination is positive.

At this moment, the prescribed image forming apparatus may determine that optional data communication is impossible if the image forming apparatus is working. This results, because the CPU 11 generally requires to be used to the maximum of its performance for an image formation. The personal interface 18 may transmit code data (ACK) indicating a positive response to the corresponding image forming apparatus when receiving the code data indicating that the optional data communication is possible. After that, the personal interface 18 may execute the optional data communication therebetween.

Figure 25B:
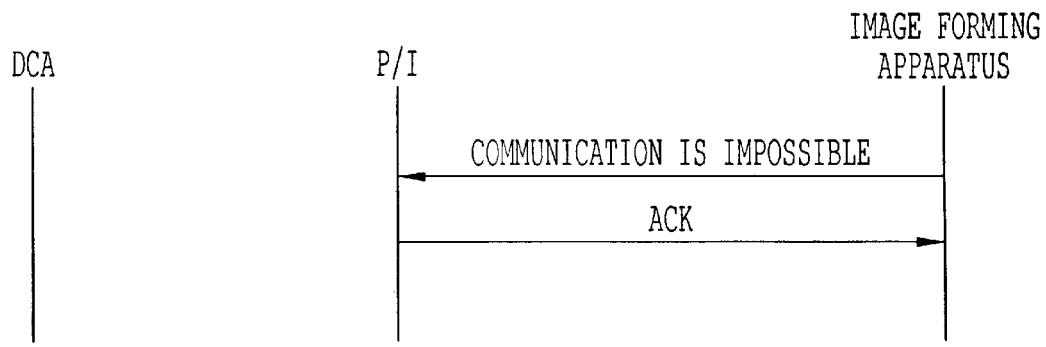

Another data communication to be executed when the optional data communication between a prescribed personal interface 18 and a corresponding image forming apparatus is impossible is hereinbelow explained referring to FIG. 25B. The image forming apparatus may determine if data communication between the image forming apparatus and the corresponding personal interface 18 is possible. If the determination result is negative, the image forming apparatus may transmit code data, indicating that data communication therebetween is impossible, to the corresponding personal interface 18.

The personal interface 18 may transmit code data (ACK) indicating a positive response to the corresponding image forming apparatus when receiving the above-mentioned communication impossibility indicating code data. The personal interface 18 may inhibit every data communication with the image forming apparatus. Namely, it may not transmit the communication data to the image forming apparatus until the image forming apparatus transmits code data indicating that optional data communication is possible.

Figure 25C:
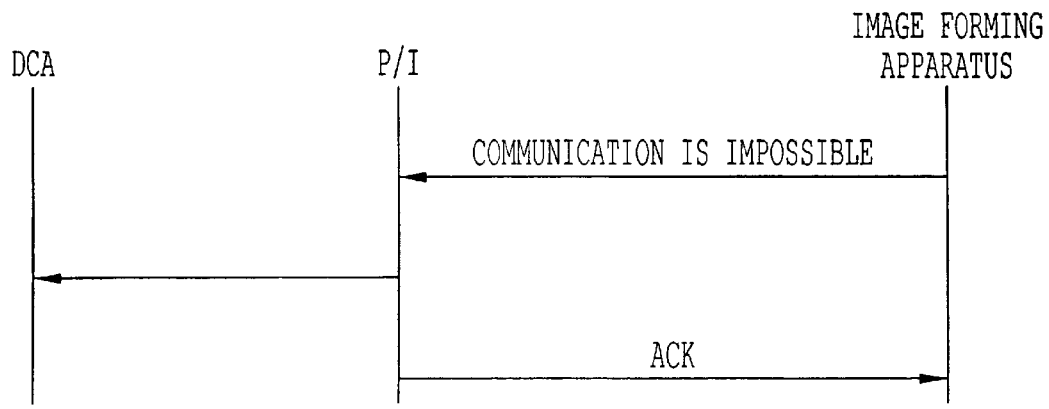

Data communication to be executed for data communication between a prescribed image forming apparatus and its personal interface 18 is hereinbelow explained referring to FIG. 25C. When data communication between the image forming apparatus and the personal interface 18 becomes impossible during polling or selecting, the image forming apparatus may transmit code data indicating that the optional data communication therebetween is impossible to the corresponding personal interface 18.

Further, the personal interface 18 may transmit code data indicating interruption of data communication to the corresponding data communication apparatus 7 or 17, and forcibly stop data communication when receiving the above-mentioned code data from the corresponding image forming apparatus. After that, the personal interface 18 may transmit code data (ACK) indicating a positive response to the corresponding image forming apparatus. The data communication apparatus 7 or 17 may forcibly stop data communication when receiving the interruption indicating code data from the corresponding personal interface 18.

The image forming apparatus may determine if optional data communication is possible first. The image forming apparatus then transmits code data, either indicating that the data communication is possible or indicating that it is impossible, to the corresponding personal interface 18. The personal interface 18 then executes the optional data communication with the image forming apparatus when receiving the communication possible code data, and inhibits such data communication therewith except for transmitting the code data (ACK) thereto when receiving the communication impossible code data.

Thus, a problem, which generally occurs when the CPU 11 controls data communication and an image formation at the same time, may be suppressed to occur regardless of the performance of the CPU 11. Further, another problem, which may occur when data of an image formation condition is changed during the image formation based on a request for a change of data from the personal interface 18, can be avoided.

Hereinbelow, one example of a data communication status determining process is explained referring to drawings including FIG. 26. In this example, each of the PPC controllers 31 respectively including the CPU 11 of a respective image forming apparatus may function as a data communication status determining device and a status data transmitting device.

Figure 26:
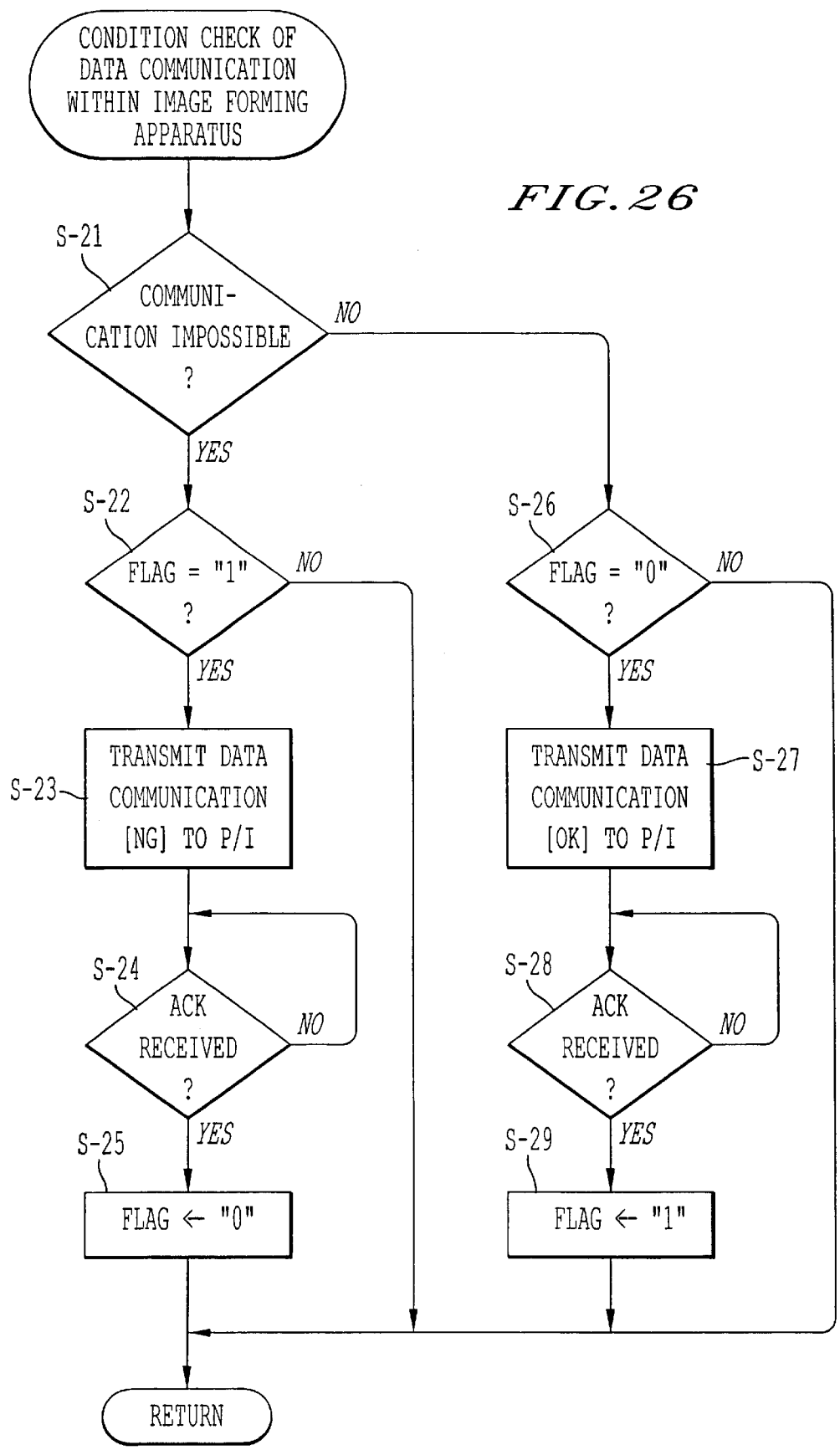
FIG. 26 is a flowchart that illustrates one example of a process for determining if optional data communication between a personal interface and a controller of the image forming apparatus illustrated in FIG. 22 is possible.

FIG. 26 illustrates a process of determining if data communication within a prescribed image forming apparatus is possible. The image forming apparatus, namely its PPC controller 31, always checks if optional data communication between the image forming apparatus and the personal interface 18 is possible. The PPC controller 31 may determine if a flag in the RAM 14 is set at "1" in step S-22, if the optional data communication is impossible in step S-21, i.e. YES in step S-21. The flag is employed for avoiding repetition of transmitting same code data. The flag is generally set at "1" when code data indicating that the data communication is possible is transmitted, and is set at "0" when code data indicating that the data communication is impossible is transmitted.

The PPC controller 31 may transmit code data indicating that data communication is impossible to the corresponding personal interface 18 in step S-23, only if the flag is set at a state "1". The PPC controller 31 may reset the flag to a state "0" in step S-25, when receiving code data (ACK) indicating data acknowledgment from the personal interface 18 in step S-24, i.e. YES in step S-24.

Further, the PPC controller 31 may transmit code data indicating that data communication is possible to the corresponding personal interface 18 in step S-27, only if the flag is set at the state "0" in step S-26. The PPC controller 31 may set the flag to the state "1" again in step S-29 when receiving code data (ACK) indicating acknowledgment of data from the personal interface 18 in step S-28, i.e. YES in step S-28.

Since each of the image forming apparatuses 1–5 always determines if optional data communication between its personal interface 18 and the image forming apparatus is possible, and quickly transmits either code data indicating that the data communication is possible or the code data indicating that it is impossible depending on the result of the determination to the corresponding personal interface 18, an advantage that the CPU 11 does not receive an overload as mentioned earlier can be obtained. Further, an erroneous operation of producing some timing for receiving some request for data communication from the personal interface 18 during the image formation may be avoided.

Hereinbelow, a modified data communication process between a prescribed PPC controller 31 of an image forming apparatus and a corresponding personal interface 18 is explained referring to the drawings including FIG. 27. In this process, the PPC controller 31 including the CPU 11 may function as a status checking device and a status data transmitting device.

Figure 27A:
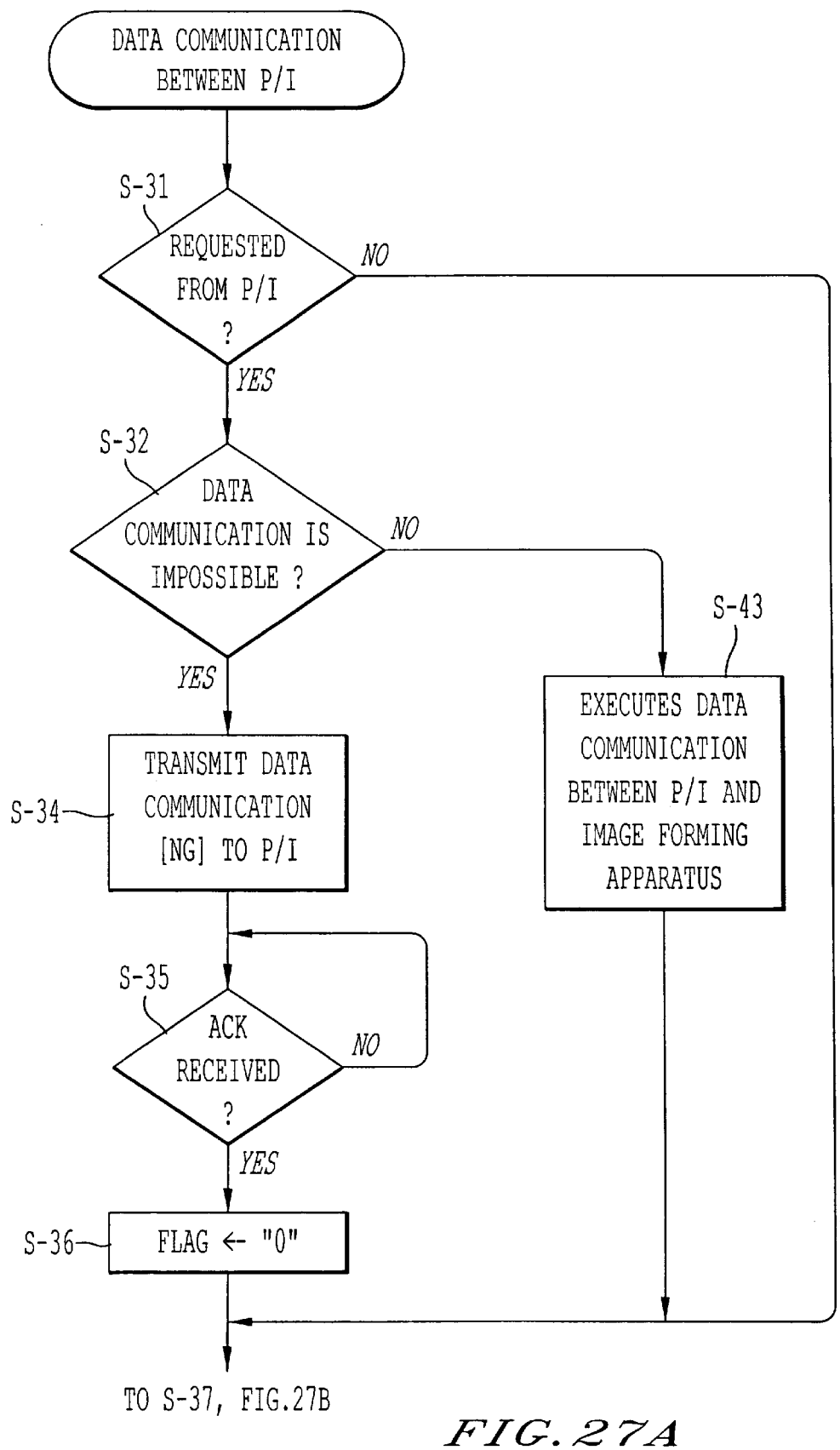
FIG. 27 is a flowchart that illustrates one example of communication between a personal interface and an image forming apparatus using a flag.
Figure 27B:
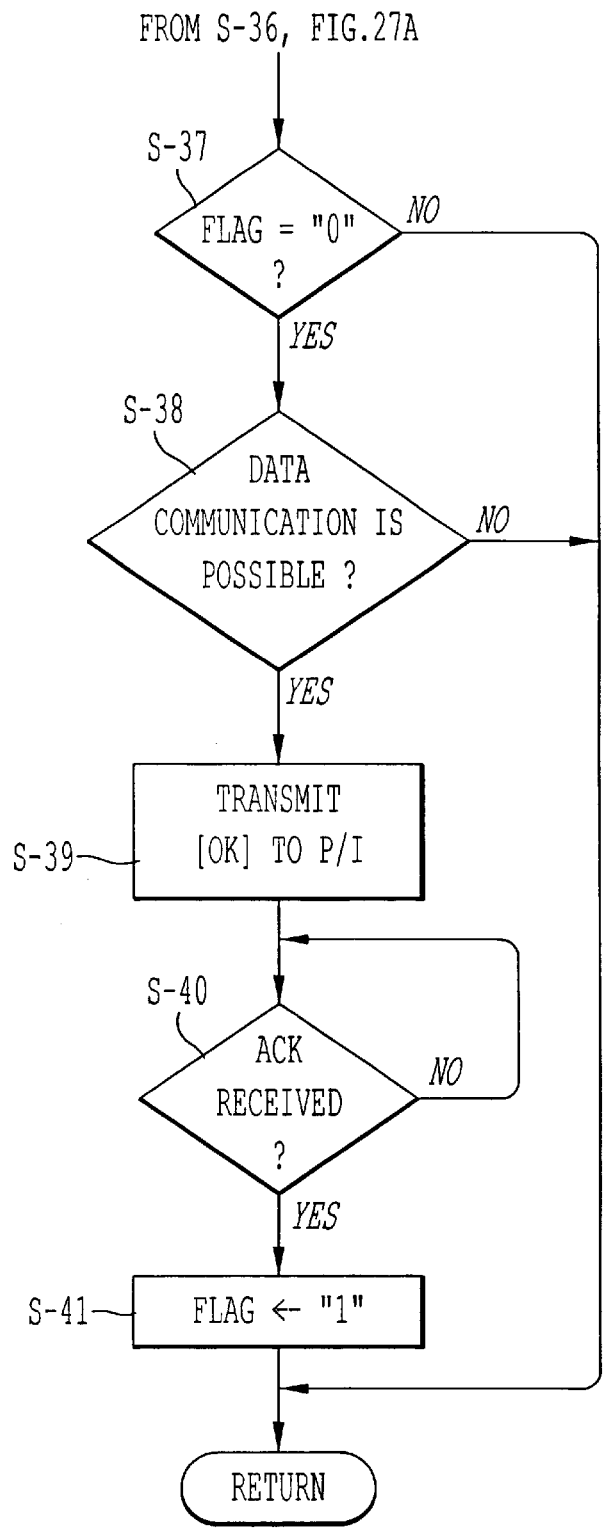

FIG. 27 illustrates one example of a data communication process between the prescribed the image forming apparatus and the corresponding personal interface 18. The PPC controller 31 of the image forming apparatus may check if it receives information indicating dealing of data from the personal interface 18 in step S-31. The PPC controller 31 may shift its job to check if data communication is possible as mentioned below in further detail, if it does not receive a request for the data communication from the personal interface 18.

The PPC controller 31 may check if optional data communication between the image forming apparatus of the PPC controller 31 and the corresponding personal interface 18 is possible in step S-32, only if it receives the data dealing request information from the corresponding personal interface 18, i.e. only if YES in step S-31. Some data communication is executed between the image forming apparatus and the personal interface 18 in step S-43, if the checking result indicates that the optional data communication is possible, i.e. if NO in step S-32. During some data communication, both selecting and polling operations are executed against the image forming apparatus, and after that, the below described determination if optional data communication between the image forming apparatus of the PPC controller 31 and the corresponding personal interface 18 is possible is executed.

If the optional data communication is impossible, the PPC controller 31 may transmit code data indicating that the data communication is impossible to the personal interface 18 in step S-34. Then, the PPC controller 31 may reset the flag to a state of "0" after receiving code data (ACK) from the personal interface 18 in step S-36.

The flag is checked if it is still at the state "0" in step S-37. If the flag indicates "0", i.e. YES in step S-37, the PPC controller 31 may further check if the optional data communication is possible in step S-38. The PPC controller 31 may transmit code data indicating that optional data communication is possible to the personal interface 18 in step S-39, and then reset the flag from the state "0" to the state "1" in step S-41 after receiving code data (ACK) from the personal interface 18 in step S-40.

Thus, since each of the image forming apparatus apparatuses 1–5 may determine if optional data communication between the image forming apparatuses and the corresponding personal interface 18 is possible when dealing of data is requested by the personal interface 18, and transmit code data indicating that the data communication is possible to the personal interface 18 when it becomes possible from being impossible, an advantage of suppressing a data communication waiting time may be obtained beside the advantage as mentioned earlier.

Depending on a kind of contents of a data dealing request from the personal interface 18 to the image forming apparatus, optional data communication sometimes can not be performed, even if the CPU 11 has a high performance. For example, if communication data transmitted from the personal interface 18 indicates that pre-stored data indicating an image formation condition for an image formation is to be changed with new data, such data communication is inhibited during the image formation to avoid occurrence of inconsistency such as a copy sequence disturbance, a paper jam, and so on. However, if a request from the personal interface 18 is only for reading the image forming condition data, such an inconsistency does not occur, and accordingly, such data communication may be performed. Namely, each of the image forming apparatuses 1–5 may transmit code data indicating that data communication is impossible when the image formation starts, and transmit code data indicating that data communication is possible when the image formation ends to the personal interface 18.

Numerous additional modifications and variations of the present invention are possible in light of the above teachings. It is therefore to be understood that within the scope of the appended claims, the present invention may be practiced otherwise than as specifically described herein.

The present document is based on subject matter described in Japanese Patent Applications JP10-125763 filed on May 8, 1999, and JP10-111846 filed Apr. 22, 1999, respectively, the contents of which are hereby incorporated herein by reference.

What is claimed is:

1. An image forming apparatus supervising system comprising:
    a central control apparatus;
    at least one image forming apparatus connected to the central control apparatus by a communication line;
    a data communication apparatus connected to the at least one image forming apparatus and the central control apparatus by the communication line;
    the at least one image forming apparatus comprising:
        a controller; and
        a personal interface connected to the controller and the data communication apparatus;
        the controller configured to determine if data communication between the controller and the personal interface is possible; and
        the controller configured to transmit information to the personal interface, which indicates that the data communication is possible when said controller determines a positive response, and transmits information to the personal interface, which indicates that the data communication is impossible when said controller determines a negative response, the negative response being generated when the image forming apparatus is working.

2. An image forming apparatus supervising system as claimed in claim 1, wherein said controller always determines said possibility of data communication between the controller and the personal interface, and transmits information indicating a result of the determination to the personal interface.

3. An image forming apparatus supervising system as claimed in claim 2, wherein said controller determines said possibility of data communication between the controller and the personal interface only when the personal interface requests dealing of data to the controller, and transmits information indicating a result of the determination to the personal interface.

4. An image forming apparatus supervising system comprising:
    a central control apparatus;
    at least one image forming apparatus connected to the central control apparatus by a communication line;
    said at least one image forming apparatus comprising:
        a controller;
        a personal interface connected to the controller;
        the controller configured to determine if data communication between the controller and the personal interface is possible; and
        the controller configured to transmit information to the personal interface, which indicates that the data communication is possible when said controller determines a positive response, and transmits information to the personal interface, which indicates that the data communication is impossible when said controller determines a negative response, the negative response being generated when the image forming apparatus is working.

5. An image forming apparatus supervising system as claimed in claim 4, wherein said controller always determines said possibility of data communication between the controller and the personal interface, and transmits information indicating a result of the determination to the personal interface.

6. An image forming apparatus supervising system as claimed in claim 5, wherein said controller determines said possibility of data communication between the controller and the personal interface only when the personal interface requests dealing of data to the controller, and transmits information indicating a result of the determination to the personal interface.

7. An image forming apparatus connected and supervised by a central control apparatus by a communication line, said image forming apparatus comprising:
    a controller connected to the communication line;
    a personal interface connected to the communication line and the controller;
    the controller configured to determine if data communication between the controller and personal interface is possible; and
    the controller configured to transmit information to the personal interface, which indicates that the data communication is possible, when said controller determines a positive response, and transmits information to the personal interface, which indicates that the data communication is impossible, when said controller determines a negative response, the negative response being generated when the image forming apparatus is working.

8. An image forming apparatus as claimed in claim 7, wherein said controller always determines said possibility of data communication between the controller and the personal interface, and transmits information indicating a results of the determination to the personal interface.

9. An image forming apparatus as claimed in claim 8, wherein said controller determines said possibility of data communication between the controller and the personal interface only when the personal interface requests dealing of data to the controller, and transmits information indicating a result of the determination to the personal interface.

* * * * *